United States Patent
Slaby et al.

(10) Patent No.: US 9,354,714 B2
(45) Date of Patent: May 31, 2016

(54) KEYPAD WITH INTEGRATED TOUCH SENSITIVE APPARATUS

(71) Applicant: GOOGLE TECHNOLOGY HOLDINGS LLC, Mountain View, CA (US)

(72) Inventors: Jiri Slaby, Buffalo Grove, IL (US); John Henry Krahenbuhl, McHenry, IL (US); Roger W Ady, Chicago, IL (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

(21) Appl. No.: 14/612,987

(22) Filed: Feb. 3, 2015

(65) Prior Publication Data
US 2015/0145780 A1    May 28, 2015

Related U.S. Application Data

(62) Division of application No. 12/873,552, filed on Sep. 1, 2010, now Pat. No. 8,976,117.

(51) Int. Cl.
| | |
|---|---|
| G06F 3/044 | (2006.01) |
| G06F 3/041 | (2006.01) |
| G06F 3/02 | (2006.01) |
| G06F 1/16 | (2006.01) |
| G06F 3/0354 | (2013.01) |

(52) U.S. Cl.
CPC .............. *G06F 3/0227* (2013.01); *G06F 1/169* (2013.01); *G06F 3/0202* (2013.01); *G06F 3/03547* (2013.01); *G06F 3/044* (2013.01); *G06F 3/0412* (2013.01)

(58) Field of Classification Search
CPC ... G06F 1/169; G06F 3/03547; G06F 3/0412; G06F 3/0202
See application file for complete search history.

(56) References Cited

U.S. PATENT DOCUMENTS

| | | | |
|---|---|---|---|
| 6,723,937 B2 | 4/2004 | Englemann et al. | |
| 7,659,887 B2 | 2/2010 | Larsen et al. | |
| 2002/0030666 A1* | 3/2002 | Philipp | G06F 3/0213 345/168 |
| 2005/0068202 A1* | 3/2005 | Shipman | G06F 3/0202 341/22 |
| 2006/0202971 A1* | 9/2006 | Kaliher | H03K 17/955 345/173 |
| 2006/0232559 A1* | 10/2006 | Chien | G06F 3/044 345/168 |
| 2007/0296709 A1 | 12/2007 | GuangHai | |
| 2008/0094373 A1 | 4/2008 | Song | |
| 2008/0150912 A1 | 6/2008 | Keski-Jaskari | |
| 2010/0231548 A1 | 9/2010 | Mangione-Smith et al. | |
| 2010/0309030 A1 | 12/2010 | Huang et al. | |

OTHER PUBLICATIONS

Atmel Products, "Single Key Touch Controller Series", http://www.atmel.com/prroducts/bsw/singletouch.asp?family_id=697; Publication Date unknown, but prior to Sep. 1, 2010.

(Continued)

*Primary Examiner* — Ariel Balaoing
(74) *Attorney, Agent, or Firm* — Morris & Kamlay LLP

(57) ABSTRACT

A touch sensitive keypad device (101) for an electronic device (100) includes one or more keys (106,107,108,109,110) situated in a keypad carrier (206). One or more conductive layers (115,116,117,118) span the keys. One or more transverse conductive layers (119,120,121,122,123,124) are integrated with a non-key component, such as the keypad carrier (205). A capacitance sensing circuit (126) detects changes in capacitance between the conductive layers and the transverse conductive layers to detect user input, thereby allowing a user (1990) to use a matrix (1902) of keys as a touch pad.

10 Claims, 17 Drawing Sheets

(56) References Cited

OTHER PUBLICATIONS

Cirque, "Technology In-Depth—GlideTouch Capacitive/Mechanical Keypads", http://www.cirgue.com/pointofsale/keypads/keypad_technology.html; Publication Date unknown, but prior to Sep. 1, 2010.

Ferromatik Milacron, "In-Mold Labeling/In-Mold Decoration", http://www.ferromatik.com/en/technologie/prozesstechniken/iml_imd/index.php; Publication Date unknown, but prior to Sep. 1, 2010.

* cited by examiner

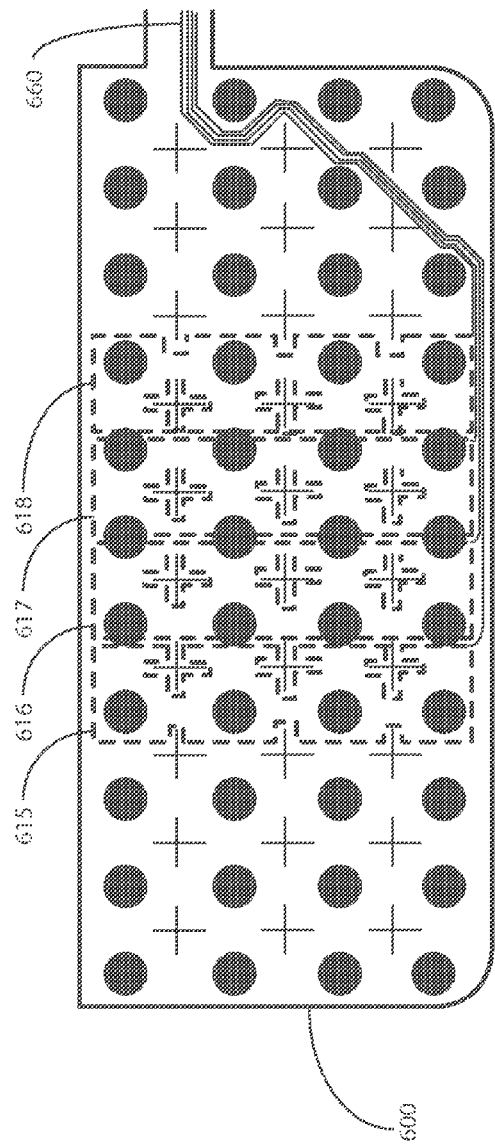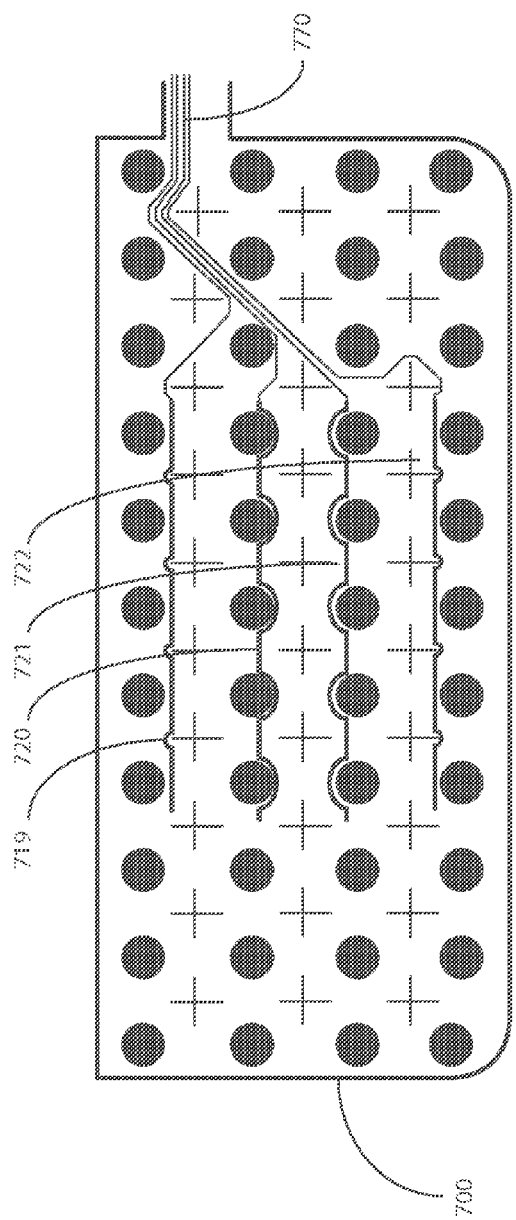

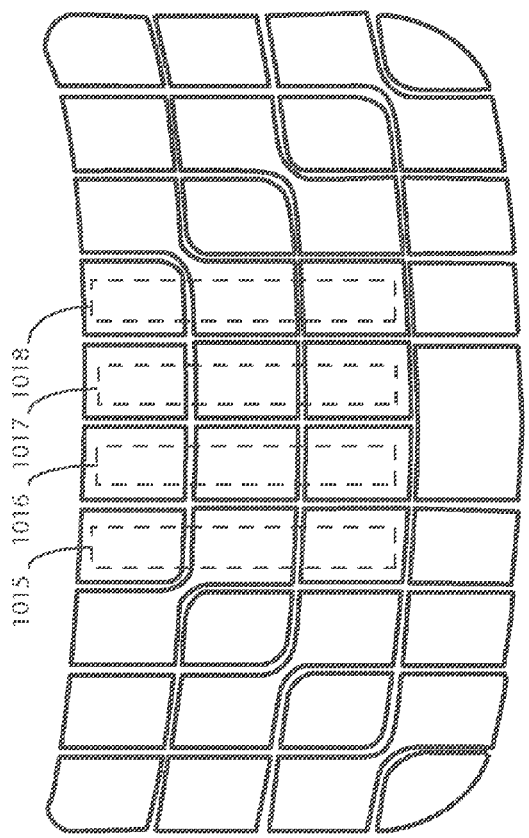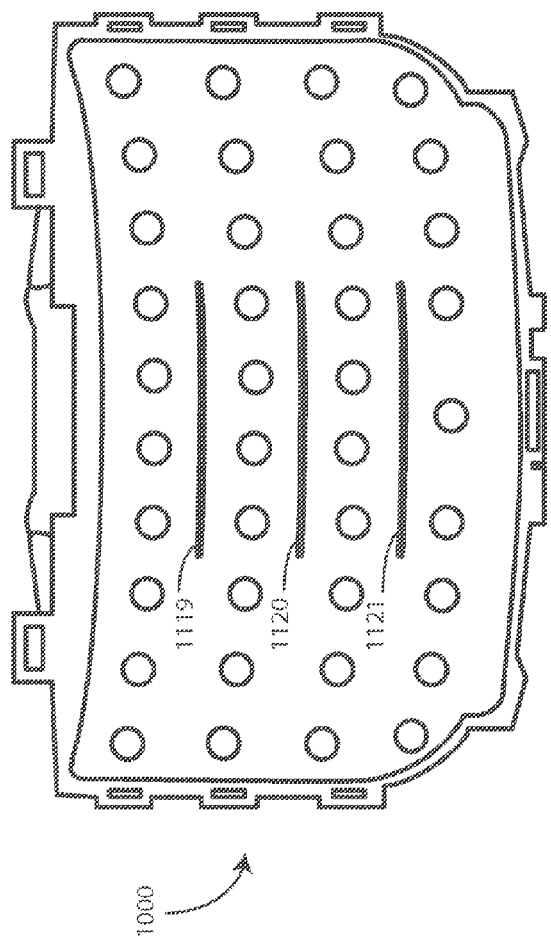
FIG. 10
FIG. 11

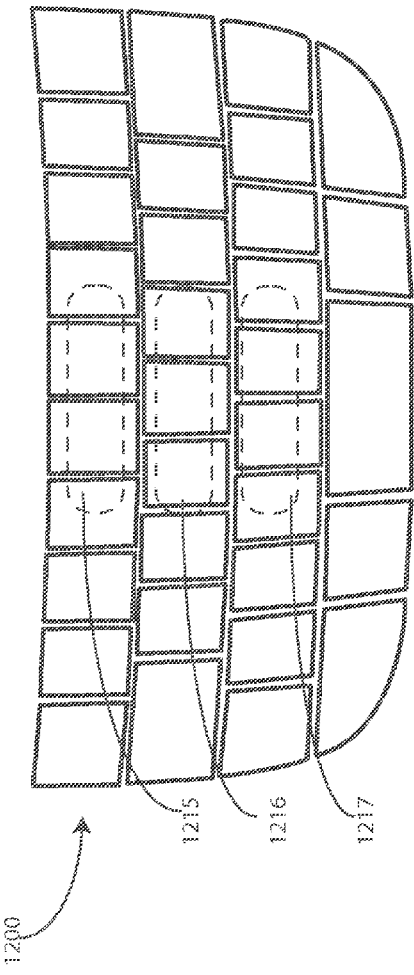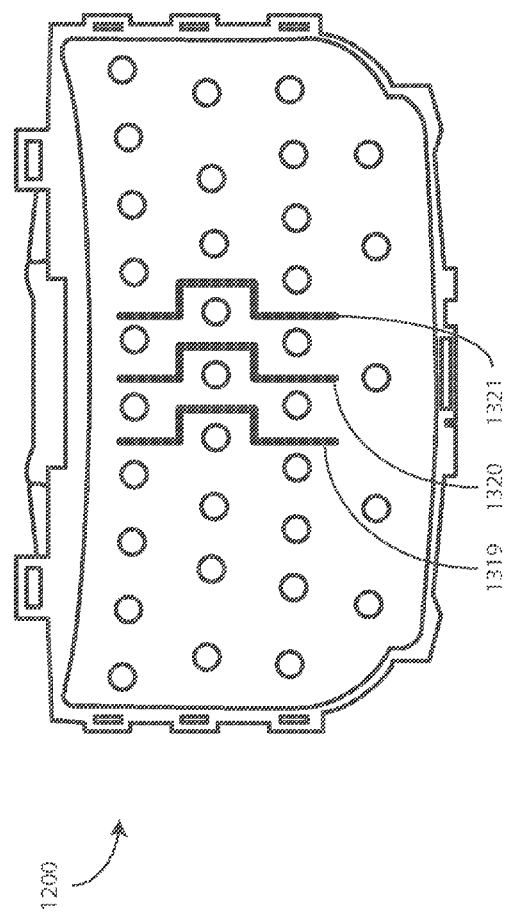
FIG. 12
FIG. 13

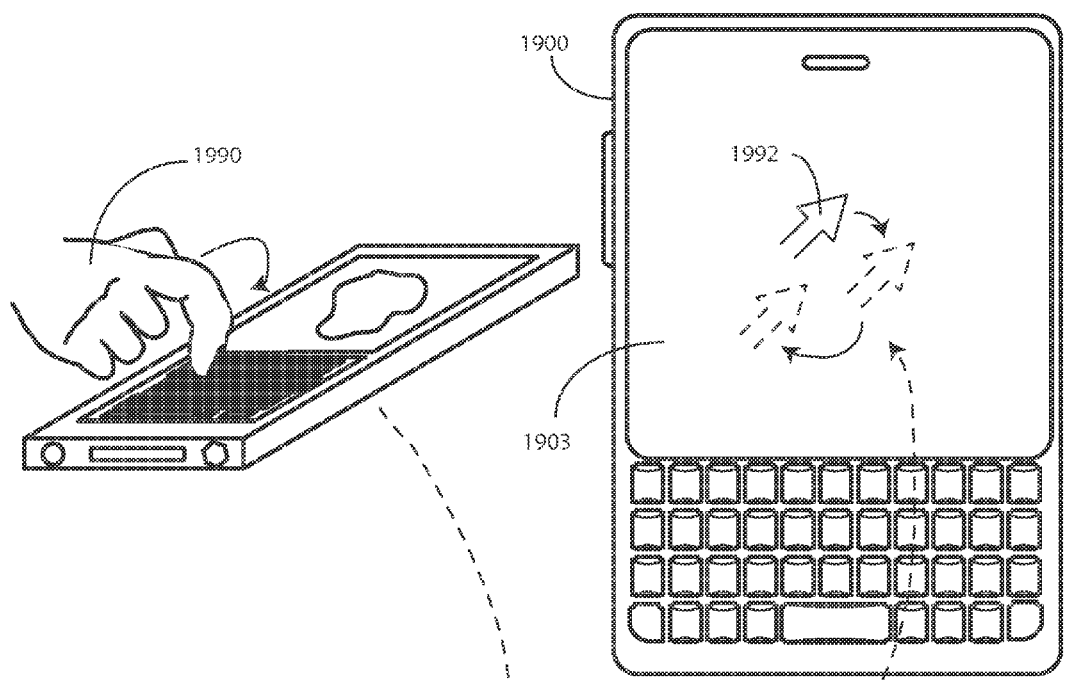
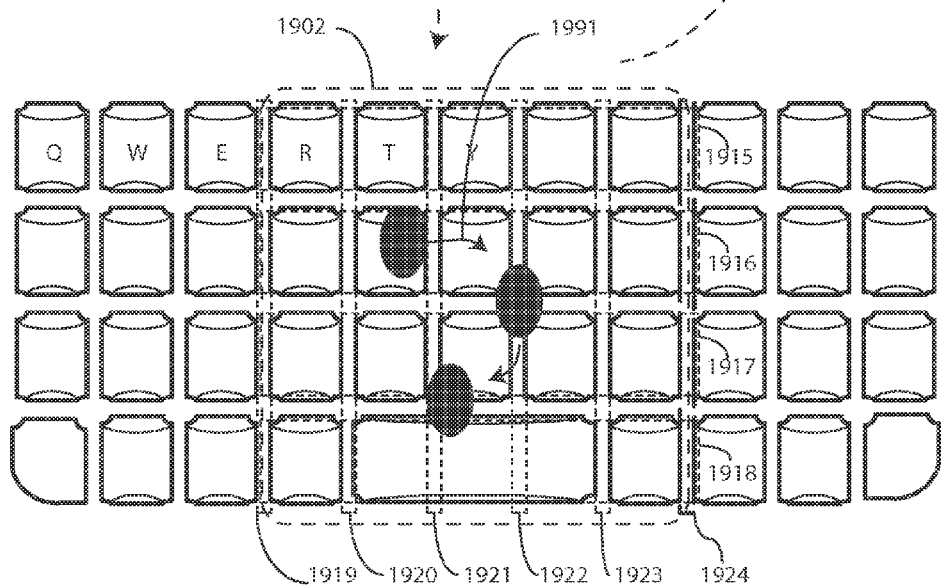
FIG. 19

KEYPAD WITH INTEGRATED TOUCH SENSITIVE APPARATUS

BACKGROUND

1. Technical Field

This invention relates generally to touch sensors, and more particularly to a touch sensor suitable for use in an electronic device.

2. Background Art

Portable electronic devices such as mobile telephones and personal digital assistants are becoming more sophisticated due to advancing technology. For example, until recently, the user interface for a mobile telephone included twelve to fifteen mechanical buttons. Today, however, many portable devices include full QWERTY keypads. While these keypads are often quite small, users can become proficient with their use, and type almost as fast as with a full-size QWERTY keypad.

Larger electronic devices, such as laptop computers, employ the use of touch pads for navigation in addition to the standard QWERTY keypad. By using a touch pad, users can move a cursor around the display to manipulate objects, navigate between applications, and actuate icons and other actuation targets. Some touch pads even facilitate the use of multi-touch gestures to more efficiently manipulate objects on the display.

With the increasing functionality of smaller devices, it would be desirable to add touch pads to mobile telephones and personal digital assistants. However, frequently there is simply not enough real estate on the surface of a compact device to accommodate a touch pad. This is especially true in a QWERTY keypad enabled device designed to be small enough to fit within a pocket.

Some devices include touch sensitive displays instead of touch pads. With a touch sensitive screen, the user touches a plastic or glass surface atop the display. Touch sensing circuits such as capacitive touch sensors then determine the location of the user's finger. While these devices work well in practice, they are not without issues. When a user touches the display, the finger invariably renders a portion of the display non-visible.

There is thus an opportunity to develop a user interface that supports touch manipulation that neither requires additional device surface area nor results in an obstructed view of the display.

BRIEF DESCRIPTION OF THE DRAWINGS

FIG. 6 illustrates a diagram of one embodiment of drivelines configured in accordance with embodiments of the invention.

FIG. 7 illustrates a diagram of one embodiment of sense lines configured in accordance with embodiments of the invention.

FIGS. 10 and 11 illustrate one embodiment of a non-linear keypad configured in accordance with embodiments of the invention.

FIGS. 12 and 13 illustrate another embodiment of a non-linear keypad configured in accordance with embodiments of the invention.

FIG. 19 illustrates a user moving a cursor in an electronic device configured in accordance with embodiments of the invention.

Figure 1:
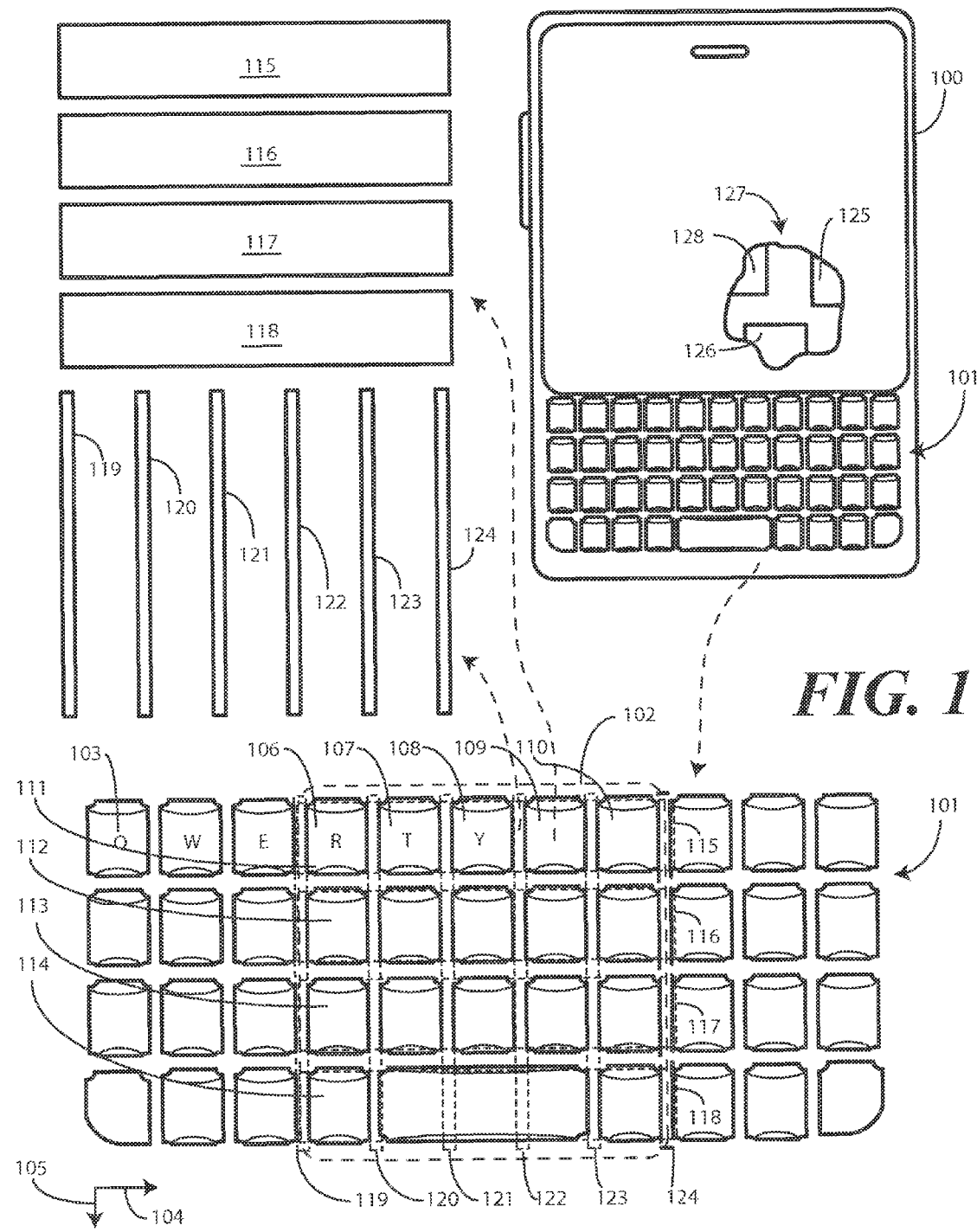
FIG. 1 illustrates one user interface for an electronic device configured in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Embodiments described below teach a touch sensitive apparatus for an electronic device that is integrated with a plurality of keys in a keypad. In one embodiment, one or more keys are supported by a keypad carrier, and are configured for movement within the keypad structure relative to the body of the electronic device. A conductive layer spans a plurality of keys, such as two or more keys in a row or column. The conductive layer can be configured as one or more strips of conductive material spanning multiple keys, or alternatively as a plurality of conductive elements having conductive bridging materials, which can be either separate or integrated with members connecting the conductive elements together. The conductive layer forms a first portion of a capacitive sensor.

The other portion of the capacitive sensor is formed by a transverse conductive layer disposed beneath the first portion of the capacitive sensor. The transverse conductive layer can be configured as a plurality of conductive strips that are connected not to the keys, but rather to other keypad components such as light guides, substrates, or the keypad carrier itself. When an electromagnetic source is coupled to either the first portion or the second portion, that portion becomes a drive layer, with the remaining portion becoming a sense layer. The two portions define a trans-capacitance that is changed when a conductive object, such as a user's finger or a stylus, comes into contact with or becomes proximately located with one of the portions. A capacitance detection circuit, which is operable with the first portion and the second portion, is configured to detect the change in capacitance and to interpret, with the assistance of one or more processors or controllers, this change as user manipulation of the touch sensitive apparatus.

In another embodiment, a plurality of conductive strips each traverse a plurality of keys of a keypad. Each conductive strip can traverse a linear row or column of keys. Alternatively, the conductive strips can be configured such that they traverse non-linear sets of adjacent keys. A plurality of transverse conductive strips, which can be configured substantially orthogonally relative to the conductive strips but need not be, pass by a second plurality of keys that is arranged in a transverse relationship with the first plurality of keys. A "criss-cross" pattern is formed by the conductive strips and the transverse conductive strips, and the configuration serves as a touch sensitive area across the keys of the keypad. This criss-cross pattern defines capacitances between the conductive strips and the transverse conductive strips. When a user passes a finger, stylus, or other conductive object across the conductive strips, a capacitance detection circuit determines that a change in capacitance has occurred and interprets this change as user manipulation of the touch sensitive area across the keys of the keypad.

When integrated into an electronic device keypad, the same surface area can support two different input modes. A user can execute keystrokes by depressing the keys or navigate a cursor or other object by passing a finger or stylus across the keys without pressing them. For example, the touch sensitive apparatus can be configured across a matrix of keys by integrating a plurality of electrically conductive layers such that each layer spans adjacent keys in a first direction. A plurality of second electrically conductive layers can then be integrated with a key carrier, a light guide, a substrate, or other non-key component so as to pass under a second set of keys in a second direction that is transverse to the first direction. When a conductive object becomes proximately located with the matrix, a capacitance detection circuit determines this and facilitates user navigation and manipulation.

FIG. 1 illustrates an electronic device 100 having a touch sensitive keypad device 101 configured in accordance with embodiments of the invention. A matrix 102, configured as a QWERTY keypad 103 in this illustrative embodiment, includes groups of keys 106,107,108,109,110 extending consecutively in a first direction 104. Other groups of keys 111, 112,113,114 extend in a second direction 105, which is transverse to the first direction 104. While the first direction 104 and the second direction 105 can be orthogonal, as will be seen in subsequent embodiments, they need not be exactly orthogonal. Note that while a QWERTY keypad 103 is used for discussion purposes in an illustrative embodiment, it will be obvious to those of ordinary skill in the art having the benefit of this disclosure that other keypad types can be substituted for the QWERTY keypad 103 without departing from the spirit and scope of embodiments of the invention.

A plurality of electrically conductive layers 115,116,117, 118 is integrated with the keys such that each layer 115 spans a corresponding plurality of consecutive keys 106,107,108, 109,110. Note also that while the area spanned by the plurality of conductive layers 115,116,117,118 is shown as being a subset of the matrix 102 in the illustrative embodiment of FIG. 1, it is contemplated that the area could include the entire matrix 102 as well. Alternatively, the area could be a portion of the matrix 102 other than that shown in FIG. 1, such as an upper left-hand corner of the matrix 102, an upper right-hand corner of the matrix 102, a non-center sub-portion of the matrix 102, a lower mid-portion of the matrix 102, and so forth.

Each conductive layer 115 can be integrated with the keys 106,107,108,109,110 in a variety of ways. For instance, in one embodiment the conductive layer 115 comprises an electrically conductive coating disposed either above or beneath the keys 106,107,108,109, 110. In another embodiment, the conductive layer 115 comprises a conductive film molded with the keys 106,107,108,109,110 by way of an in-mold-decoration (IMD) or in-mold-labeling (IML) process. In another embodiment, the conductive layer 115 is attached to the keys 106,107,108,109,110 by way of a conductive adhesive, one example of which is a translucent, conductive adhesive tape. In another embodiment, the conductive layer 115 is attached to the keys 106,107,108,109,110 by applying Poly (3,4-ethylenedioxythiophene) (PED) to the key bodies. In other embodiments, the conductive layer 115 uses one or more of conductive paint disposed either above or beneath the keys 106,107,108,109,110, indium tin oxide (ITO) disposed either above or beneath the keys 106,107,108,109,110, a metallic layer or metallic coating disposed either above or beneath the keys 106,107,108,109,110, conductive polymer disposed either above or beneath the keys 106,107,108,109, 110, or combinations thereof. The conductive layer 115 spans the keys 106,107,108,109,110 along the first direction 104. A plurality of second electrically conductive layers 119,120, 121,122,123,124 spans the second direction 105 about or beneath consecutive keys such as layer 119 next to keys 111,112,113,114. The second electrically conductive layers 119,120,121,122,123,124 are not coupled to the keys, but are rather coupled to a different component of the keypad assembly. For example, as will be seen in FIG. 2, in one embodiment the second electrically conductive layers 119,120,121,122, 123,124 are coupled to a key carrier. However, the second electrically conductive layers 119,120,121,122,123,124 can be coupled to other keypad structures, such as a keypad carrier configured to hold keys in place, a light guide configured to deliver light from a source disposed beneath the matrix 102 of keys, a housing of the electronic device, a rigid substrate such as a printed circuit board or flexible circuit board disposed beneath the matrix 102 of keys, a flexible substrate disposed beneath the matrix 102 of keys, a stiffener disposed along the key carrier, or combinations thereof.

As noted above, the first direction 104 and the second direction 105 are transverse with respect to each other. While this can mean orthogonal, it need not be so. Embodiments of the invention work so long as each of the second conductive layers 119,120,121,122,123,124 passes beneath at least two layers of the electrically conductive layers 115,116,117,118, thereby forming a lattice pattern. Accordingly, the first direction 104 and the second direction 105 can be non-orthogonal, as will be shown in the description of FIGS. 10-15 below.

By integrating the first conductive layers 115,116,117,118 with the keys, while the second electrically conductive layers 119,120,121,122,123,124 are integrated with a non-key component, an electrically isolated gap is created between the conductive layers 115,116,117,118 and the second electrically conductive layers 119,120,121,122,123,124. This gap can be used to define a plurality of trans-capacitances between the conductive layers 115,116,117,118 and the second conductive layers 119,120,121,122,123,124 when one or the other is connected to a drive circuit 125. When a conductive object touches or becomes proximately located with the conductive layers 115,116,117,118, a capacitance sensing circuit 126 can detect changes in the capacitance and can interpret these changes as user input. Accordingly, the matrix 102 can be used either as a keypad or as a touch pad.

By way of example, in the exemplary embodiment of FIG. 1, electronic circuitry 127 can be seen in the electronic device 100. The illustrative electronic circuitry 127 of FIG. 1 includes a drive circuit 125, a controller 128, and a capacitance sensing circuit 126. These components may be embodied by a microprocessor, programmable logic, or other control circuit, and are electrically operable with the conductive layers 115,116,117,118 and the second conductive layers 119,120,121,122,123,124. For example, the capacitance sensing circuit 126 can receive input from the electrode pairs formed by the conductive layers 115,116,117,118 traversing the second conductive layers 119,120,121,122,123,124. These components can be configured to execute embedded firmware stored in an associated memory.

A drive circuit 125 is configured to apply a voltage having amplitude measured relative to a circuit ground to either the conductive layers 115,116,117,118 or the second conductive layers 119,120,121,122,123,124. In one embodiment, the drive circuit 125 is configured as an electromagnetic source and is coupled to the conductive layers 115,116,117,118, thereby making them the "drive lines" (and the second conductive layers 119,120,121,122,123,124 the "sense lines"). In one embodiment the drive circuit 125 is disposed within the keypad. In other embodiments, the drive circuit 125 is disposed at other locations, with electrical leads passing to the conductive layers 115,116,117,118. The drive circuit 125 can be configured, for example, to provide a characteristic, frequency-based signal to the drivelines. Exemplary signals include AC waves, square waves, step functions, or other suitable signals varying in time.

When the drive circuit 125 excites the drive lines, an electric field is established between the drive lines and the sense lines. This electric field defines a "drive line to sense line" trans-capacitance that can be measured with the capacitance sensing circuit 126. Examples of capacitance sensing circuits are known in the art. One example of an illustrative capacitance sensing circuit is a charge-transfer capacitance sensing circuit, although it will be obvious to those of ordinary skill in the art having the benefit of this disclosure that other capacitance sensing circuits may also be used.

As noted above, in one embodiment the integration of the conductive layers 115,116,117,118 with the keys and the second conductive layers 119,120,121,122,123,124 with non-key components establishes a gap between the drive lines and the sense lines. When the drivelines are driven, electric fields are established between the drive and sense lines. When a conductive object, such as a user's finger or stylus, touches or becomes proximately located with the drive or sense lines, the field between the drive and sense lines changes, thereby changing the measurable capacitance. The capacitance sensing circuit 126 can then sense these changes. By measuring the capacitance change, the system can interpret and respond to user input.

The capacitance sensing circuit 126 is coupled to the drive and sense lines. The capacitance sensing circuit 126 is configured to detect and measure an indication of capacitance between the drive and sense lines in response to the application of a signal by the drive circuit 125. As such, the capacitance sensing circuit 126 can detect a change in the capacitance when a conductive object becomes proximately located with the drive or sense lines.

In one embodiment, a controller 128, which can be a microprocessor, programmable logic, or other control device, is included and is operable with the capacitance sensing circuit 126. The controller 128 is configured with executable code to determine the location of user contact based on the location of the sensed change in capacitance. Executable firmware stored in an associated memory (not shown) can be used to program the controller 128 to make the user input determination. For example, a reference capacitance, which is a measure of capacitance when the capacitive sensor is in a rest state, can be stored in memory. When a conductive object becomes proximately located with the sensor, the capacitance sensing circuit 126 relays the location(s) of the detected change in capacitance to the controller 128. The controller 128 can then interpret this as user input, and can effect a corresponding manipulation of objects or applications running on the electronic device 100.

FIGS. 2-5 illustrate various options for placement of the plurality of conductive strips and the plurality of transverse conductive strips within a keypad stack-up. In order to establish a gap between the two sets of conductive strips that can support a capacitance that can be affected by a user's finger touching a keypad, the plurality of conductive strips is situated on or near a contact surface of the keypad. The contact surface can include the tops of keys, parts of the device housing between the keys, other exposed elements between keys, or a combination of various types of keypad surfaces. The transverse conductive strips are generally situated in a keypad stack-up below the contact surface (toward the interior of the electronic device). Depending on the implementation, the gap distance between the plurality of conductive strips and the transverse conductive strips can vary. Various structures with the keypad stack-up can be made conductive to help the capacitance sensing circuit detect changes in capacitance caused by a user touching or being proximately located with a conductive strip.

Figure 2:
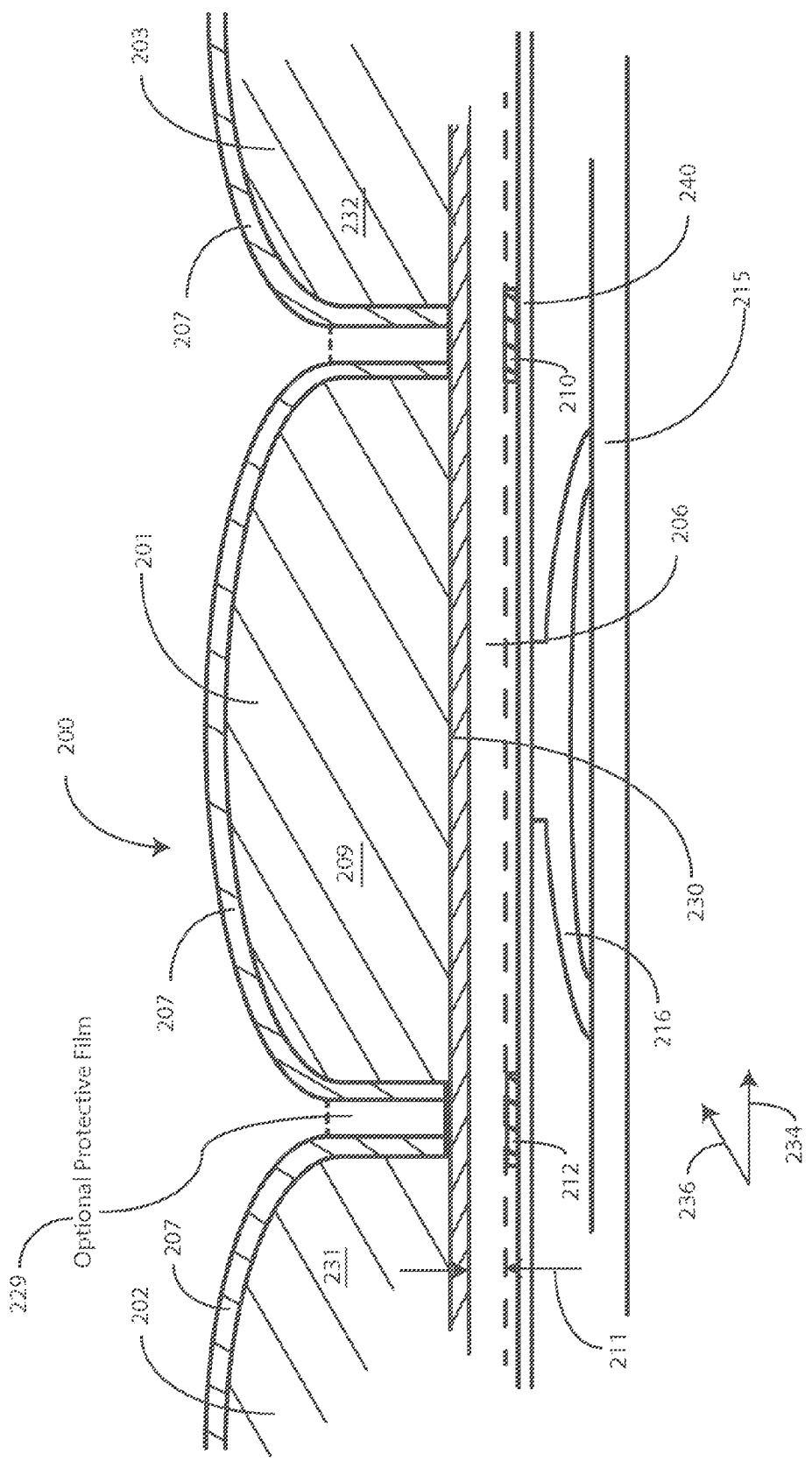
FIG. 2 illustrates a sectional view of one user interface configured in accordance with embodiments of the invention.

FIG. 2 illustrates a sectional view of a touch sensitive apparatus 200 for an electronic device configured in accordance with one embodiment of the invention. As shown in FIG. 2, one or more keys 201,202,203 of a keypad device are situated on a keypad carrier 206. Each key has a corresponding key body 209,231,232. For ease of illustration, attention will be paid to key 201 to describe this particular embodiment. It will be understood that the configuration of key 201 can be replicated in accordance with the description of FIG. 1 above to construct this particular embodiment.

A conductive layer 207 is disposed along the perimeter of the conductive body 209 of key 201. In one embodiment, it can be integrated into key 201. In another embodiment, it is configured as a second part. In the latter embodiment, the conductive layer 207 can be configured as conductive silicone disposed atop key 201. In addition to silicone, the conductive layer 207 can be made from Poly(3,4-ethylenedioxythiophene) material, indium tin oxide, and so forth as described herein. Conductive layer 207 is one of a plurality of conductive layers integrated with or disposed along one or more keys of a keypad device. As shown in FIG. 2, the conductive layer 207 can span multiple keys. In one embodiment, the conductive layer 207 is coupled to the drive circuit (125) and serves as a driveline in the capacitive sensor. Optional protective film 229 can be disposed between and/or atop of the keys 201,202,203.

The key body 209 can be made in a variety of ways, and is shown in this embodiment as being conductive. The key body 209 can be manufactured from a conductive thermoplastic or a translucent conductive thermoplastic. In this configuration, the key body 209 itself becomes an extension of the conductive layer 207.

In an alternate embodiment where the key body is not conductive, the key body is manufactured from a thermoplastic material by way of an injection molding process. The key body 209 can then be coated with a conductive material, such as conductive paint, conductive printing, or a conductive coating. Where the conductive layer 207 is integrated by an IML or IMD process, this step will include the integration of the conductive layer 207 with the key body.

A transparent conductive adhesive layer 230 connects the key bodies 209,231,232 together in a first direction 234. The use of the transparent conductive adhesive layer 230 provides additional electrical coupling between adjacent keys 202, 201, 203 in the first direction 234. Note that non-transparent conductive adhesive can be substituted for the transparent conductive adhesive layer. Where backlighting is desired and non-transparent conductive adhesive is employed, apertures can be cut in the non-transparent conductive adhesive to permit light to pass through.

One or more transverse conductive layers 210,212 shown in FIG. 2 as extending into and out of the page in a second direction 236, are affixed to a non-key component element of the keypad stack-up. In the illustrative embodiment of FIG. 2, the transverse conductive layers 210,212 are integrated with the keypad carrier 206. Transverse conductive layer 210 is one of a plurality of transverse conductive layers disposed beneath the keys 201,202,203. For instance, another transverse conductive layer 212 can be seen in FIG. 2 as well. While the transverse conductive layers 210,212 may be integrated with any of the key carrier 206, a light guide 240, or a substrate 215, in this embodiment they are disposed beneath the key carrier 206. A gap 211 formed by a portion of the key carrier 206 in FIG. 2 (and alternatively can be provided by a dielectric material such as PET or air), in some embodiments provides electrical isolation between drive and sense lines. Note that conductive layers 210,212 are separated from the conductive layer 207 and key body 209, which is also conductive, by an insulated gap 211 formed by the key carrier 206 or other insulating material. When the conductive layer 207 is coupled to the drive circuit (125), an electrical trans-capacitance is defined between the conductive layer 207 and the transverse conductive layers 210, 212. As noted above, this capacitance is configured to change when a conductive object touches or becomes proximately located with the conductive layer 207.

Stiffeners (not shown in FIG. 2) can be added between the keypad carrier 206 and a substrate 215 to provide additional mechanical integrity to the keypad. Mechanical actuators configure the keys 201,202,203 for movement. For example, mechanical actuator 216 is configured as a popple dome and is disposed beneath key 201. Each mechanical actuator is disposed beneath a corresponding key body and is configured to oppose an actuation force applied to any of the one or more keys 201,202,203 to register standard key-presses.

Figure 3:
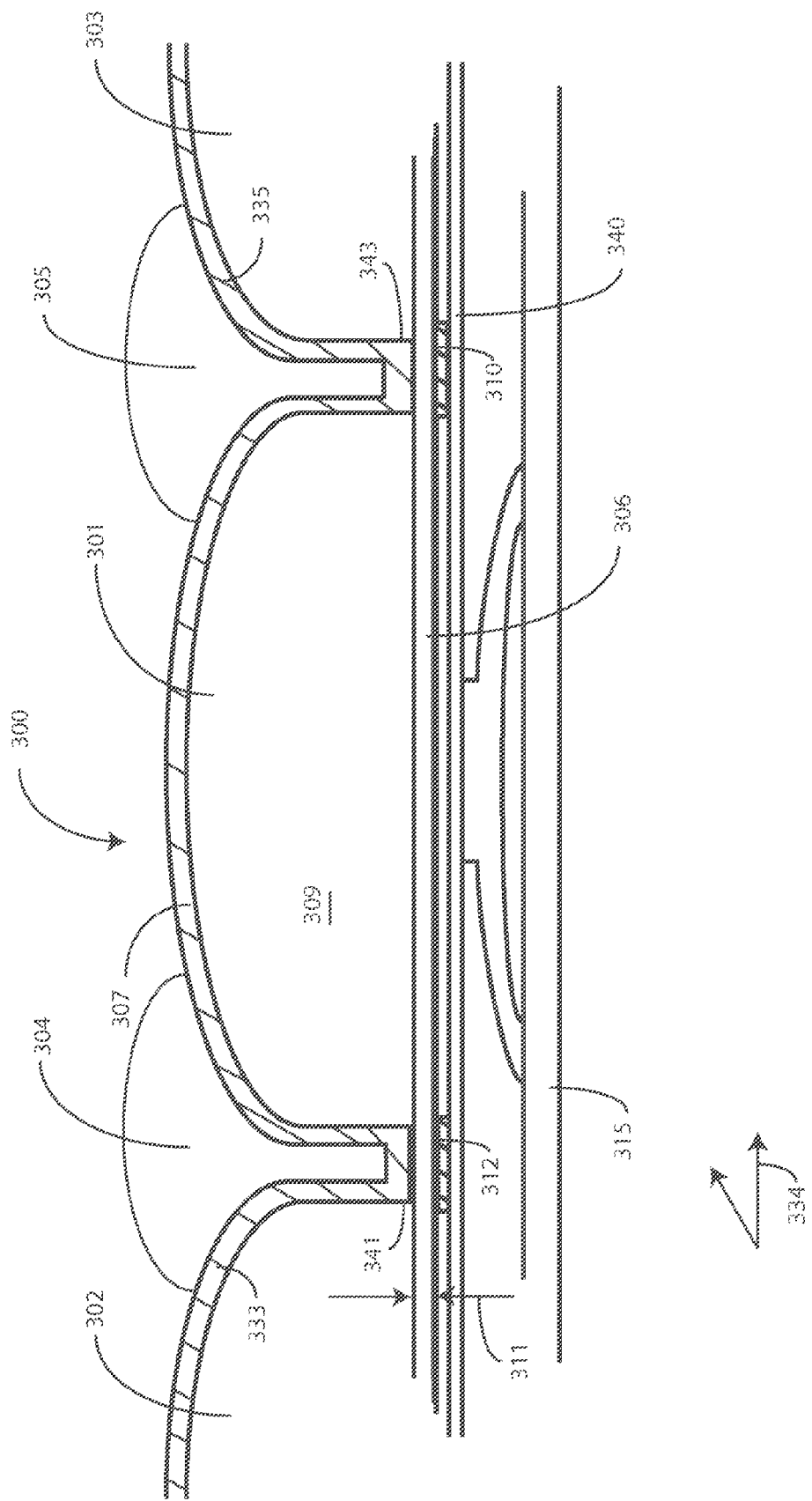
FIG. 3 illustrates a sectional view of another user interface configured in accordance with embodiments of the invention.

FIG. 3 illustrates an alternate embodiment of a touch sensitive apparatus 300 for an electronic device configured in accordance with one embodiment of the invention. The touch sensitive apparatus 300 of FIG. 3 is similar to the touch sensitive apparatus (200) of FIG. 2, with conductive layer segments 307,333,335 spanning one or more keys 301,302, 303 of a keypad device. While the touch sensitive apparatus (200) of FIG. 2 included keys (201,202,203) arranged in a linear relationship, the keys 301,302,303 of FIG. 3 are arranged in a staggered relationship, with alternate row keys 304,305 appearing offset behind keys 301,302,303.

In the embodiment of FIG. 3, the conductive layer segments 307,333,335 are made from individual components that each span a single key and are coupled together by members 341,343 of conductive material. The members 341, 343 of conductive material link the conductive layer segments 307,333,335 together to form the "layers" described with reference to FIG. 1. Said differently, the conductive layers comprise a plurality of individual conductive layer segments 307,333,335, with each of the plurality of conductive layer segments being coupled to an adjacent conductive layer segment by conductive member 341,343, which may also be referred to as a "lip" or bridge contact.

As with FIG. 2, the conductive layer segments 307,333,335 are coupled across multiple keys 301,302,303 in a first direction 334. In FIG. 3, the key body 309 is manufactured from a non-conductive, pellucid thermoplastic. Note that the key body 309 could alternately be configured as non-pellucid plastic as well. As with FIG. 2, the conductive layer segments 307,333,335,341,343 can be manufactured from a conductive coating, conductive paint, or conductive print disposed on the key body 309. Further, the conductive layer segments 307, 333,335,341,343 could be transparent or non-transparent.

Also as with FIG. 2, the embodiment of FIG. 3 includes a plurality of transverse conductive layers 310,312 extending a second direction 336, i.e., into and out of the page. The plurality of transverse conductive layers 310,312 is disposed beneath the key carrier 306 in this illustrative embodiment, although they can be integrated with the key carrier 306, a light guide 340, or a substrate 315. Accordingly, a gap 311 is formed between conductive layer segments 307,333,335 having conductive bridges 341,343 and the transverse conductive layers 310,312. When the conductive layer segments 307, 333,335,341,343 are coupled to the drive circuit (125), an electrical trans-capacitance is defined between the conductive layer segments 307,333,335,341,343 and the plurality of transverse conductive layers 310,312. This trans-capacitance changes when a conductive object touches or becomes proximately located with the conductive layer segments 307,333, 335,341,343.

Figure 4:
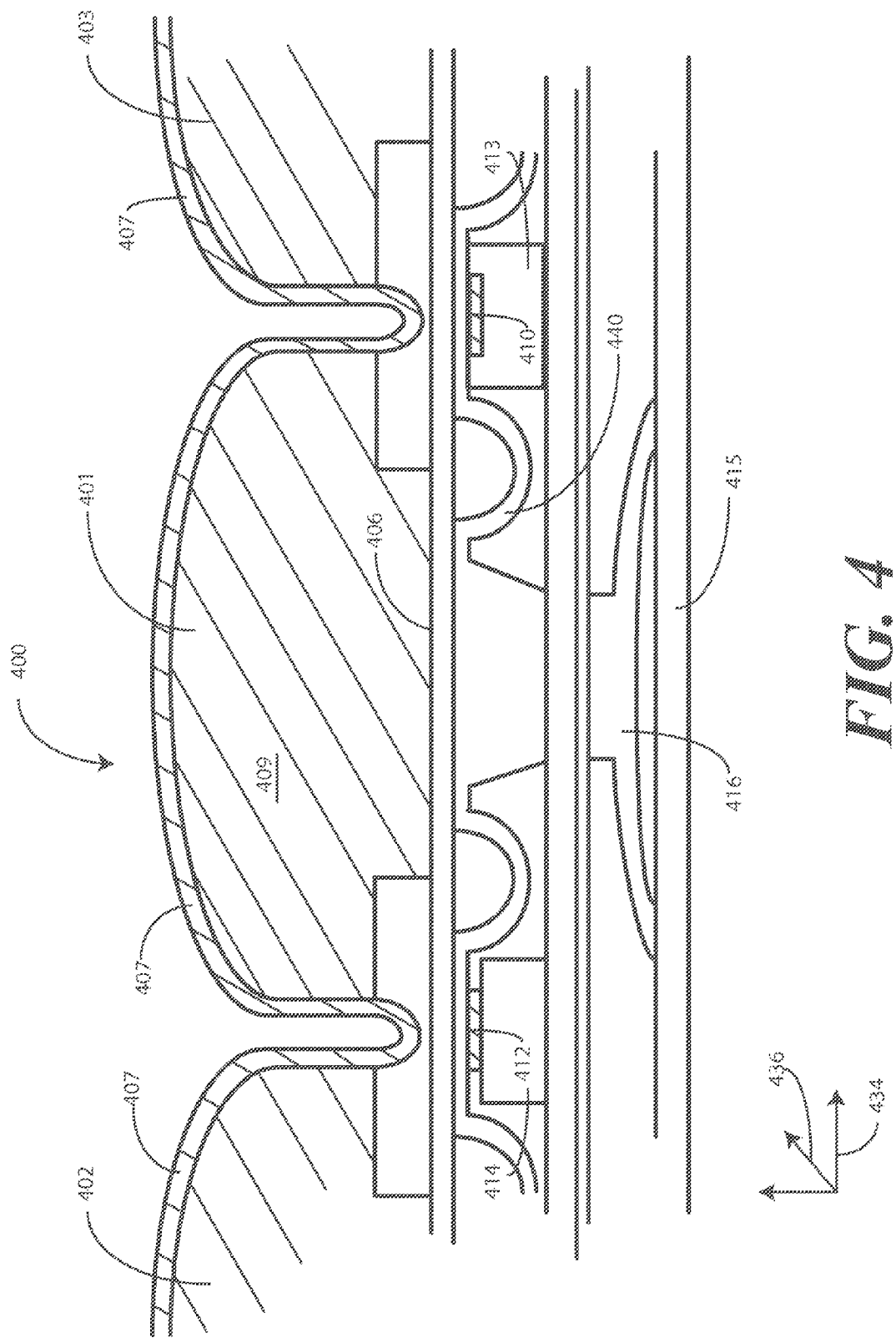
FIG. 4 illustrates a sectional view of a third user interface configured in accordance with embodiments of the invention.

FIG. 4 illustrates a third embodiment of a touch sensitive apparatus 400 for an electronic device configured in accordance with one embodiment of the invention. The touch sensitive apparatus 400 of FIG. 4 is similar to the touch sensitive apparatus (200) of FIG. 2, except with a continuous conductive layer 407 spanning one or more keys 401,402,403 of a keypad device in a first direction 434. The embodiment of FIG. 4 differs slightly from that of FIG. 2 in that the conductive layer 407 is configured with a different mechanical construction.

In FIG. 4, the key body 409 is manufactured from a conductive, pellucid thermoplastic. This construction makes the key body 409 capable of acting as a light guide through which light may pass for backlighting or other effects. As with previous embodiments, key body 409 could optionally be standard plastic, or standard translucent plastic, or conductive plastic. The key body 409 is disposed atop a flexible material 440, which may be manufactured from silicone or another material, and which allows force to transfer from the key body 409 to the mechanical actuator 416 disposed above the substrate 415. The flexible material 440 can optionally be configured as a light guide that delivers light from an electroluminescent source (not shown) to the conductive, pellucid thermoplastic of the key body 409 for backlighting. Mechanical stiffeners 413,414 provide additional structural integrity to the apparatus 400.

As with FIGS. 2 and 3, the embodiment of FIG. 4 includes a plurality of transverse conductive layers 410,412 extending into and out of the page along direction 436, thereby being oriented transversely with respect to conductive layer 407. While they may be integrated with any of the key carrier 406, a flexible material 440, or a substrate 415, in this embodiment the plurality of transverse conductive layers 410,412 are disposed proximately with the stiffeners 413,414.

Note that multiple possible embodiments are illustrated in FIG. 4. For example, note that in one embodiment the transverse conductive layers 410,412 could be integrated with the stiffeners 413,414, as is shown on the right side of the page with transverse conductive layer 410 being integrated with stiffener 413. Alternatively, in another embodiment, the transverse conductive layers 410,412 could be disposed atop the stiffeners 413,414, as shown on the left hand side of the page with transverse conductive layer 412 being disposed atop stiffener 414. Of course, a combination of the two approaches could also be used. However, frequently all transverse conductive layers 410,412 will be either integrated within or disposed along the stiffeners 413,414. Two different embodiments are shown in FIG. 4 for illustration, although the embodiment of FIG. 4 could be used in practice as well. Alternatively, the transverse conductive layers could also be integrated with flexible material 440.

Figure 5:
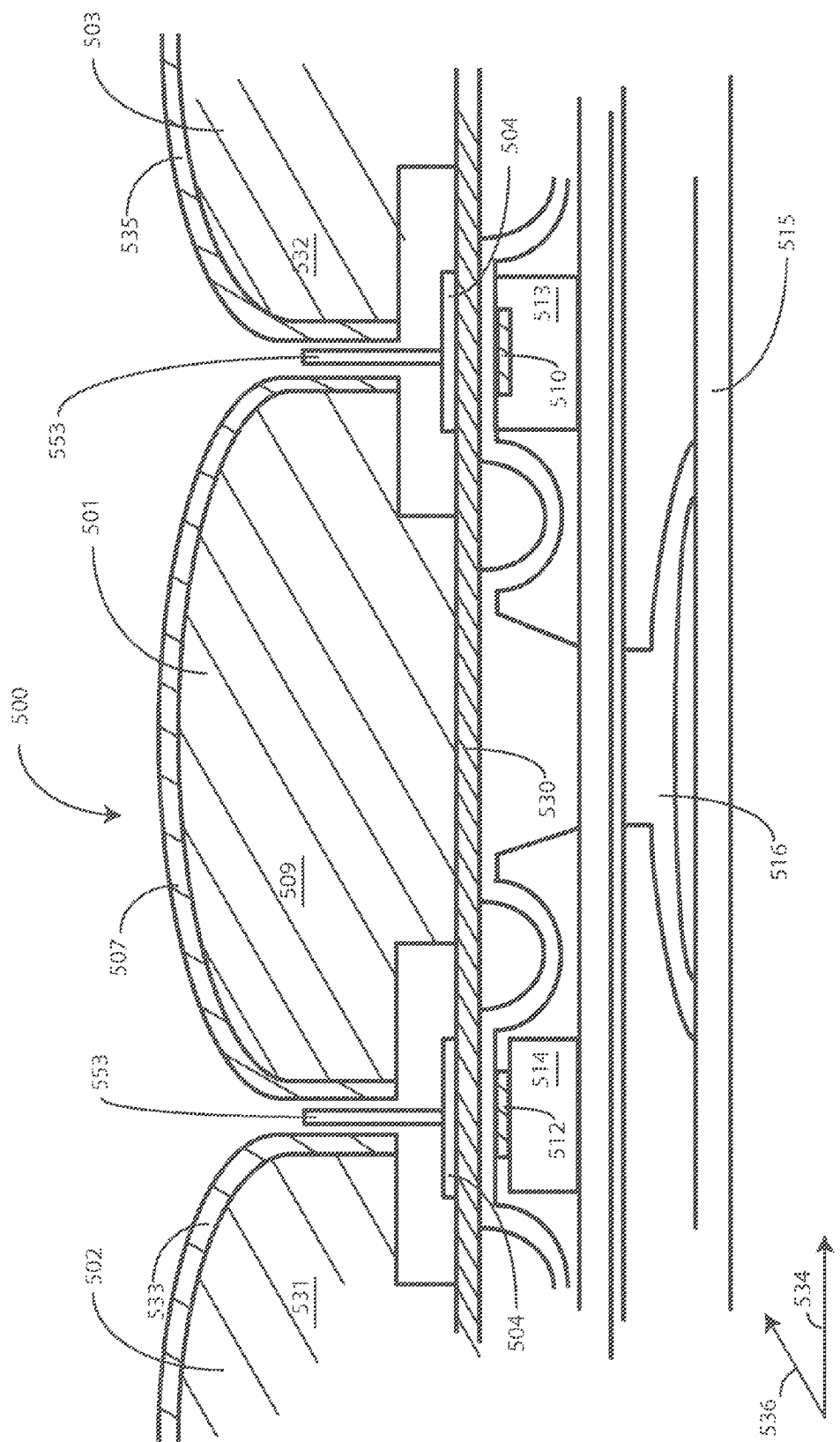
FIG. 5 illustrates a sectional view of yet another user interface configured in accordance with embodiments of the invention.

FIG. 5 illustrates yet another embodiment of a touch sensitive apparatus 500 for an electronic device configured in accordance with one embodiment of the invention. The touch sensitive apparatus 500 of FIG. 5 is similar to the touch sensitive apparatus (400) of FIG. 4, with a few variations. A discontinuous conductive layer 507,533,535 spans one or more keys 501,502,503 of a keypad device. Each key 501, 502,503 has a webbing 553 disposed between the key bodies 509,531,532. The webbing may be an extension of the front housing around the keypad structure or it may be a separate piece. The webbing 553 sits atop a protective cover 504 so as to be isolated from a conductive adhesive layer 530. Although the webbing 553 is shown separately from the protective cover 504, the two components can be manufactured as a single integrated piece. In FIG. 5, the key bodies 509,531,532 are manufactured from a conductive, pellucid thermoplastic. This construction makes the key body 509 an extension of the conductive layer 507 and the conductive adhesive layer 530, as well as a light guide through which light may pass for backlighting or other effects.

The conductive adhesive layer 530 extends along direction 534 and connects the key bodies 509,531,532 together. In this illustrative embodiment, the conductive adhesive layer 530 is transparent. The use of the transparent conductive adhesive layer 530 provides additional electrical coupling between adjacent keys 502,501,503. A non-transparent conductive adhesive can be substituted for the transparent conductive adhesive layer 530. Where backlighting is desired and non-transparent conductive adhesive is employed, apertures can be cut in the non-transparent conductive adhesive to permit light to pass through.

As with the figures above, the embodiment of FIG. 5 includes a plurality of transverse conductive layers 510,512 extending along a direction 536 into and out of the page. While they may be integrated with any of a number of components, in this embodiment the plurality of transverse conductive layers 510,512 are disposed proximately with stiffeners 513,514. Note that the transverse conductive layers 510,512 could be integrated with the stiffeners 513,514, as is shown on the right side of the page with transverse conductive layer 510 being integrated with stiffener 513. Alternatively, the transverse conductive layers 510,512 could be disposed atop the stiffeners 513,514, as shown on the left hand side of the page with transverse conductive layer 512 being disposed atop stiffener 514. Frequently all transverse conductive layers 510,512 will be either integrated within or disposed along the stiffeners 513,514. Two different embodiments are shown in FIG. 5 for illustration, although the embodiment of FIG. 5 could be used in practice as well.

During operation of the keypad of FIGS. 2-5 as a keypad, a force on a key 201, 301, 401, 501 is transferred through the keypad stack-up via the key carrier (and other elements) to compress the mechanical actuator 216, 316, 416, 516 and bridge contacts on the substrate 215, 315, 415, 515. During operation of the keypad of FIGS. 2-5 as a touch sensor, no force is provided to compress the mechanical actuator. Instead, the user's finger affects the trans-capacitance between a conductive strip and a transverse conductive strip. This change in capacitance is detected by the capacitance sensing circuit (126).

Turning now to FIGS. 6 and 7, illustrated therein are exemplary substrates 600,700 showing how the conductive layers 615,616,617,618 and the transverse conductive layers 719, 720,721,722 can be electrically wired in accordance with one or more embodiments of the invention. As shown in FIG. 6, one or more drivelines 660 can connect the conductive layers 615,616,617,618 to the drive circuit (125) and the capacitance sensing circuit (126). Similarly, one or more sense lines 770 couple the transverse conductive layers 719,720,721,722 to the capacitance sensing circuit (126). Note that the drive circuit could be coupled to the transverse conductive layers 719,720,721,722 rather than the conductive layers 615,616, 617,618, which means that the sense lines would be coupled to the first conductive layers 615,616,617,618.

Figure 8:
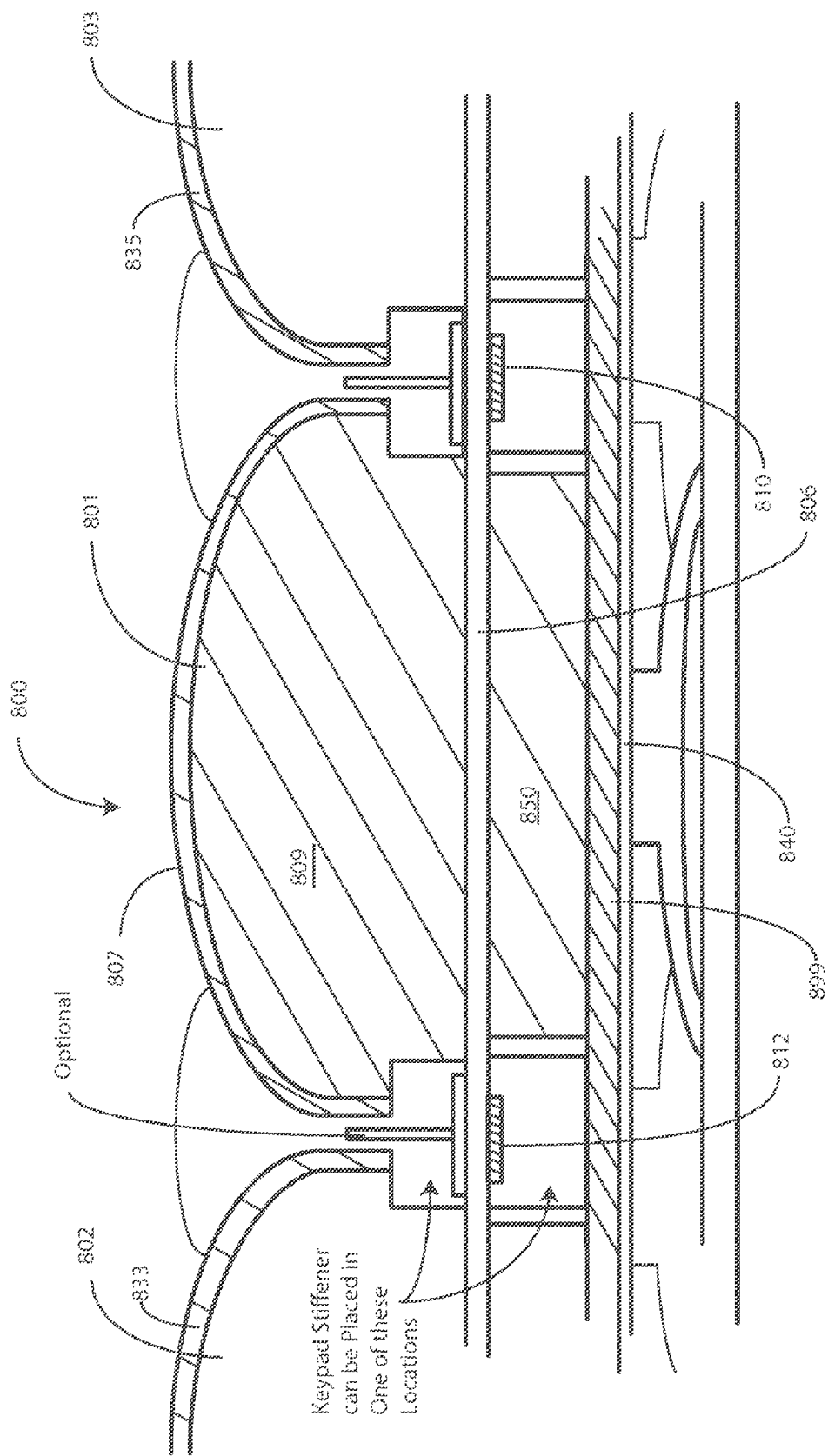
FIG. 8 illustrates a sectional view of another user interface configured in accordance with embodiments of the invention.

FIG. 8 illustrates yet another alternate embodiment of a touch sensitive apparatus 800 for an electronic device configured in accordance with one embodiment of the invention. The touch sensitive apparatus 800 of FIG. 8 includes a non-continuous conductive layer 807,833,835 that spans one or more keys 801,802,803 of a keypad device. Each key body 809 is manufactured from a conductive thermoplastic. This construction makes the key body 809 an extension of the conductive layer 807.

The key body 809 is capacitively coupled to an intermediate component 850 across the key carrier 806. Where the intermediate component 850 is used, the key body 809 can capacitively couple to the intermediate component 850. A conductive layer 899 then connects the intermediate components together to form a drive line. The drive lines then capacitively couple to the transverse conductive layers 810, 812. Accordingly, a "three-layer" trans-capacitance capacitor is formed. The three-layer trans-capacitance capacitor resembles a sandwich with key body 809 and a transverse conductive layer 810,812 forming the bread, and intermediate component 850 forming the filling. Of course, the layers of the sandwich are electrically isolated from one another. Such a configuration allows the transverse conductive layers 810, 812 to be placed in different locations, such as beneath the key carrier 806. Alternatively, they may be placed beneath the light guide 840. As with the figures above, a plurality of transverse conductive layers 810,812 extend into and out of the page.

Figure 9:
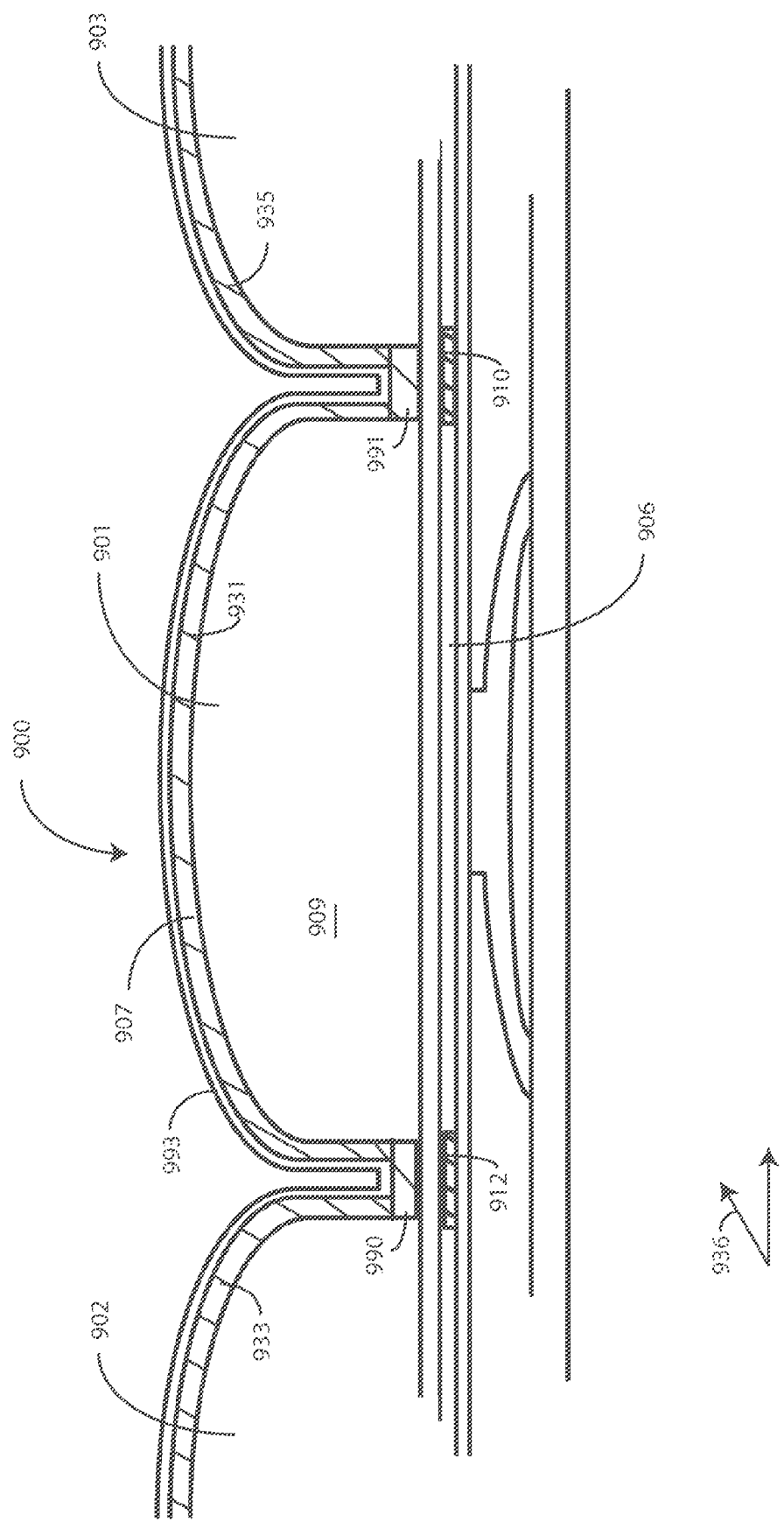
FIG. 9 illustrates a sectional view of another user interface configured in accordance with embodiments of the invention.

FIG. 9 illustrates yet another alternate embodiment of a touch sensitive apparatus 900 for an electronic device configured in accordance with one embodiment of the invention. The touch sensitive apparatus 900 of FIG. 9 includes a conductive layer segments 907,933,935 spanning one or more keys 901,902,903 of a keypad device. Each key body 909 is manufactured from a non-conductive thermoplastic. In FIG. 9, the conductive layer comprises a plurality of conductive layer segments 907,933,935 coupled by bridge contacts 990, 991. A protective layer 993 is disposed atop the conductive layer segments 907,933,935 and optionally the bridge contacts 990, 991.

As with the figures above, a plurality of transverse conductive layers 910,912 extend into and out of the page along direction 936. The plurality of transverse conductive layers 910,912 are integrated with the key carrier 906 in this illustrative embodiment.

Turning now to FIGS. 10-13, illustrated therein are two keypads configured for touch sensitive apparatus in accordance with embodiments of the invention. FIGS. 10 and 11 illustrate one keypad 1000, while FIGS. 12 and 13 illustrate another keypad 1200. Prior to this point, illustrative embodiments of the invention have shown keys in linear rows and/or linear columns, with the conductive layers and transverse conductive layers being generally orthogonal. However, as mentioned previously, other geometric configurations are possible.

As shown in FIGS. 10-13, embodiments of the invention can be applied to keypads 1000,1200 having non-linear arrangements of keys. Accordingly, the directions in which the conductive layers and transverse conductive layers traverse will also be non-linear. For example, the keys of the keypads 1000,1200 of FIGS. 10-13 are arranged in a curvilinear fashion. For this reason, the conductive layers and transverse conductive layers will be non-linear. Further, the transverse relationship between the two will be non-orthogonal.

Beginning with FIGS. 10-11, a plurality of conductive strips 1015,1016,1017,1018 are integrated to consecutive keys such that each conductive strip 1015,1016,1017,1018 traverses a plurality of consecutive keys. Each plurality of consecutive keys extends in a vertical direction, as shown in FIG. 10.

A plurality of transverse conductive strips 1119,1120,1121 traverses under a second plurality of keys such that each transverse conductive strip 1119,1120,1121 passes beneath at least two of the conductive strips 1015,1016,1017,1018. In the illustrative embodiment of FIGS. 10-11, at least one key is disposed between the conductive strips 1015,1016,1017,1018 and the transverse conductive strips 1119,1120,1121. Each transverse conductive strip 1119,1120,1121 extends in a substantially horizontal direction, as shown in FIG. 11.

Since the horizontal rows of keys are curvilinear, each transverse conductive strip 1119,1120,1121 has a corresponding curvilinear shape. Note that if the vertical columns of keys had been non-linear, the conductive strips 1015,1016, 1017,1018 could have had a shape corresponding to the geometric structure of each column.

The keypad 1200 of FIGS. 12-13 is similar to that of FIGS. 10-11, except that the conductive strips 1215,1216,1217 are oriented substantially horizontally. Accordingly, each conductive strip 1215,1216,1217 is curvilinear to match the geometric construction of the rows. Similarly, as shown in FIG. 13, each transverse conductive strip 1319,1320,1321 can be oriented in a non-linear fashion to accommodate a particular geometric configuration.

Figure 14:
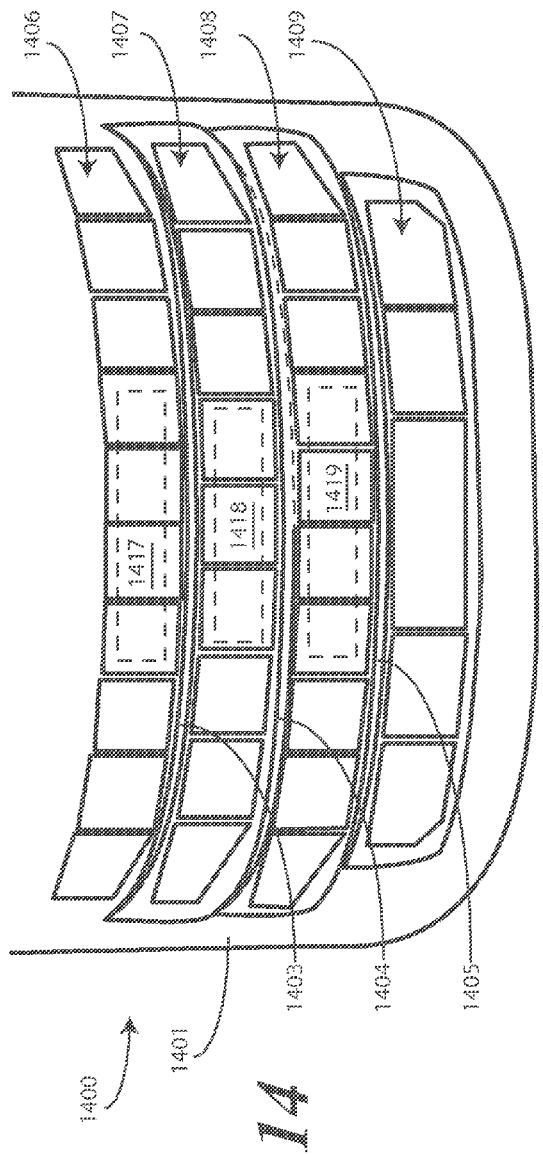
FIGS. 14 and 15 illustrate yet another embodiment of a non-linear keypad configured in accordance with embodiments of the invention.
Figure 15:
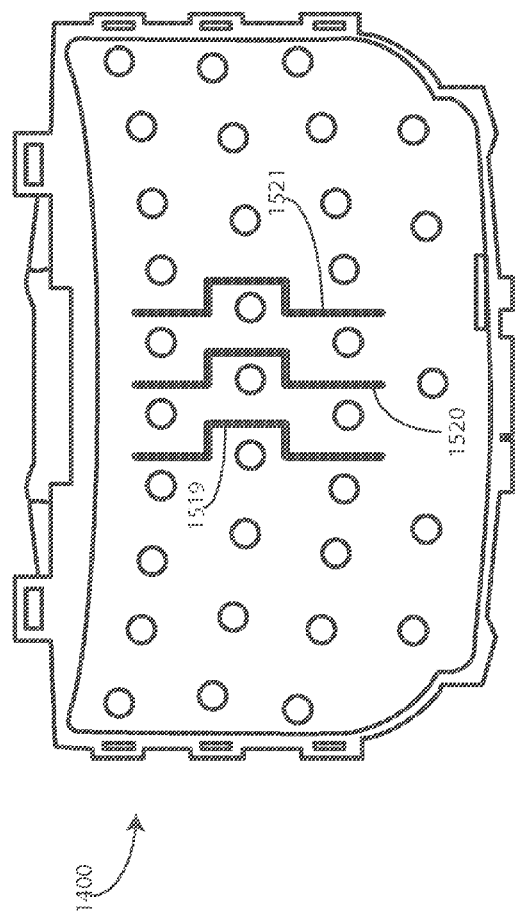

Turning now to FIGS. 14 and 15, illustrated therein is an alternate embodiment of a keypad 1400 configured in accordance with embodiments of the invention. As shown in FIG. 14, the electronic device into which the keypad 1400 is operable has a housing 1401. The housing 1401 includes portions 1403,1404,1405 disposed between sets 1406,1407,1408,1409 of keys. The portions 1403,1404,1405 could alternately be implemented as webbing components described in FIG. 5 above. Accordingly, the conductive strips 1417,1418,1419 have been configured horizontally so as to span multiple keys without traversing the housing portions 1403,1404,1405. Further, the transverse conductive strips 1519,1520,1521 have been oriented substantially vertically so as to be transverse relative to the conductive strips 1415, 1416,1417. Note that each transverse conductive strip 1519, 1520,1521 traverses the key carrier in a non-linear manner.

Figure 16:
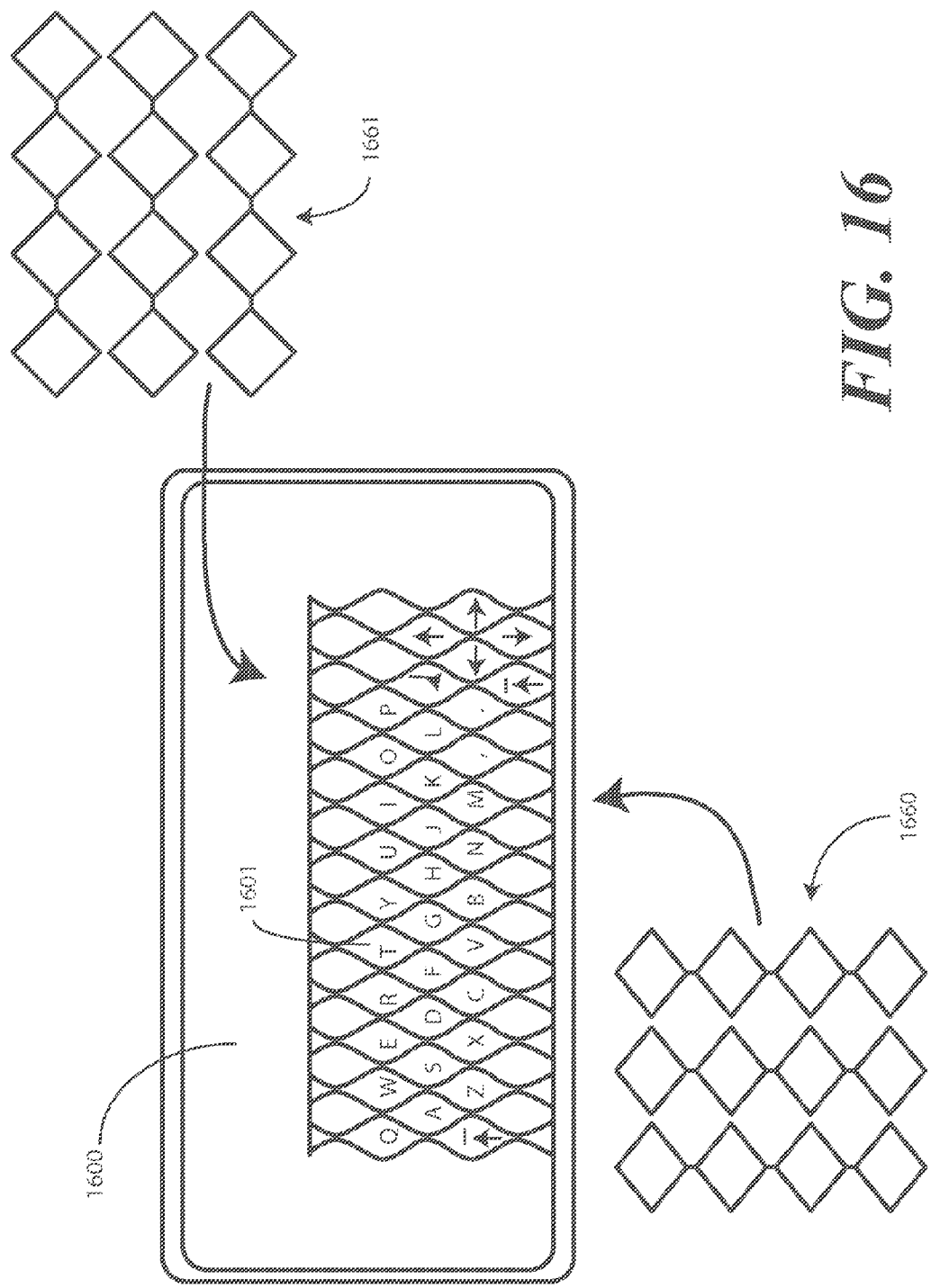
FIG. 16 illustrates yet another embodiment of a non-linear keypad configured in accordance with embodiments of the invention.

FIG. 16 illustrates an alternate keypad 1600 configured in accordance with embodiments of the invention. FIG. 16 illustrates that the keys of the keypad 1600 can have non-standard or non-rectangular actuation surface shapes. In the illustrative embodiment of FIG. 16, each key 1601 has a curvilinear, streamlined diamond shape. The conductive layers 1660 can similarly be configured, as can the transverse conductive layers 1661. In this illustrative embodiment, the conductive layers 1660 comprise a plurality of conductive layer segments, with each of the plurality of conductive layer segments being coupled to an adjacent conductive layer segment by a bridge contact as described above.

Figure 17:
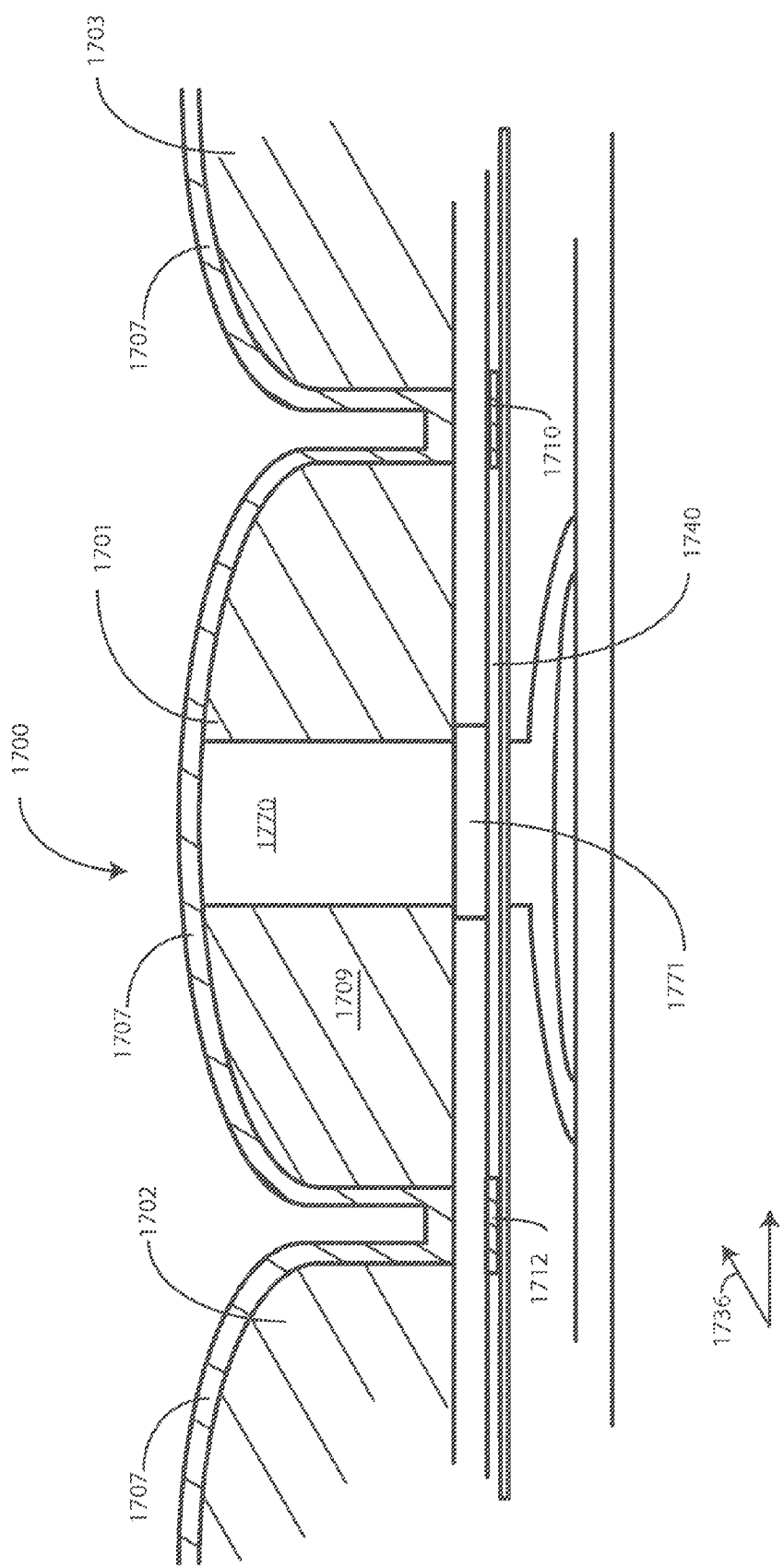
FIG. 17 illustrates a sectional view of another user interface configured in accordance with embodiments of the invention.
Figure 18:
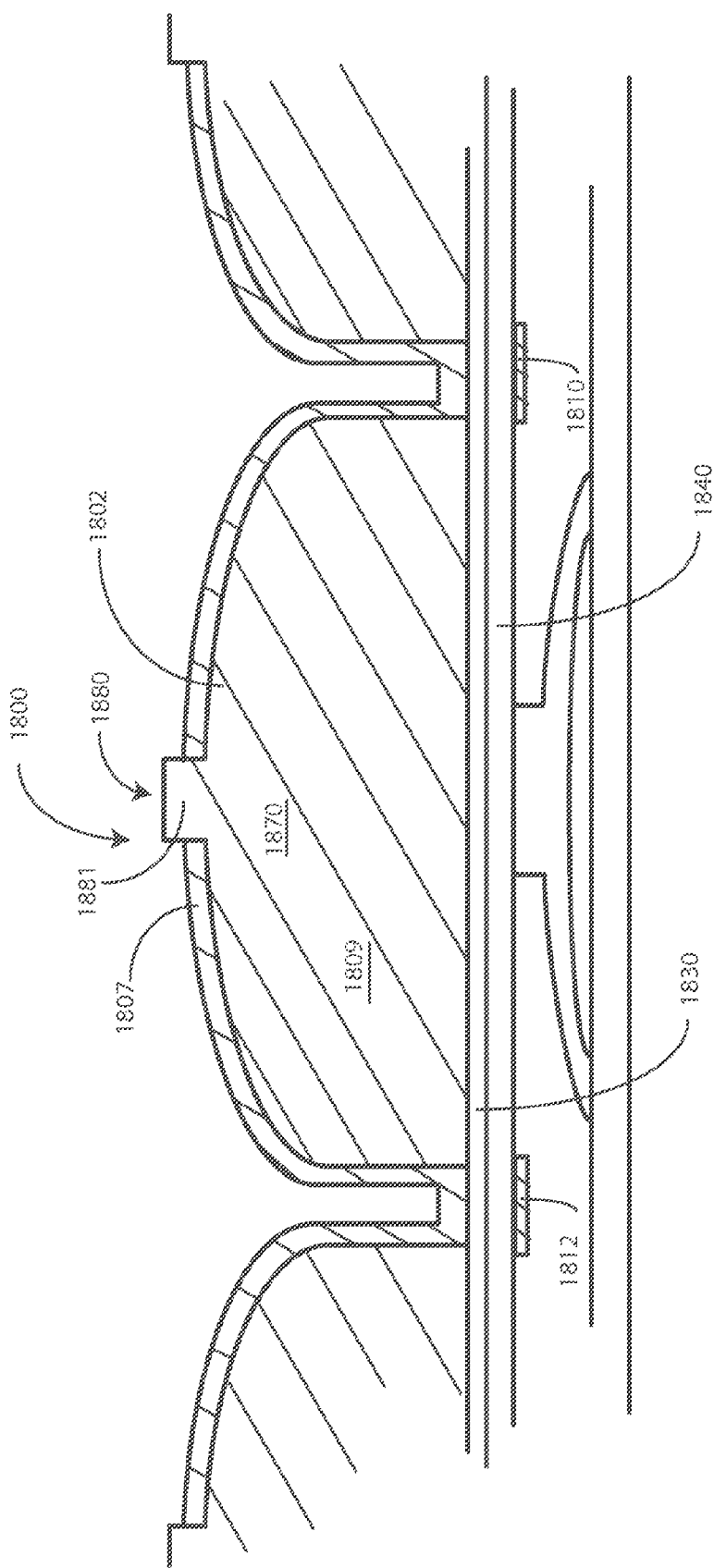
FIG. 18 illustrates a sectional view of yet another user interface configured in accordance with embodiments of the invention.

FIGS. 17-18 show configurations with light guides integrated into the keys for backlighting key indicia or otherwise providing light at a keypad surface. FIG. 2 shows a light guide (240) within a keypad stack-up, and FIG. 3 shows a light guide (340) within a keypad stack-up having integrated transverse conductive layers (310, 312). FIGS. 17-18 show one or more methods for directing light from within a keypad stack-up to a keypad surface.

FIG. 17 illustrates yet another alternate embodiment of a touch sensitive apparatus 1700 for an electronic device configured in accordance with one embodiment of the invention. As with other embodiments, the touch sensitive apparatus 1700 of FIG. 17 includes a conductive layer 1707 spanning one or more keys 1701,1702,1703 of a keypad device. Each key body 1709 is manufactured from a conductive thermoplastic. In the illustrative embodiment of FIG. 17, each key body 1709 has a light guide 1770 integrated therein. Note that while the light guide 1770 and the guide 1771 below are shown as being cylindrical, they could also be conical. Thus, when an electroluminescent or light emitting diode light source (not shown) is configured to either project light upward from the bottom of each key 1701,1702,1703, or is configured to deliver light from a planar light guide 1740, light can pass through the planar light guide 1740, through the key carrier light guide 1771 (or alternately local openings in the key carrier), through the key body light guide 1770 to backlight the touch sensitive apparatus 1700.

As with the figures above, a plurality of transverse conductive layers 1710,1712 extend into and out of the page along direction 1736. The plurality of transverse conductive layers 1710,1712 is integrated with the planar light guide 1740 in this illustrative embodiment; however, it could be integrated with the key carrier as well.

FIG. 18 illustrates an alternate touch sensitive apparatus 1800. In FIG. 18, the conductive layer 1807 is formed from metal, and includes an aperture 1880 through which a portion 1881 of the key body 1809 can pass. The sense lines 1810, 1812 are disposed beneath a planar light guide 1840. The apertures 1880 are disposed atop each key and correspond to the location of the portion 1881 that extends through the aperture 1880. This extension of the key body 1809 provides a tactile surface that a user can feel when touching each key. Thus, the portion 1881 of the key body 1809 provides tactile feedback to the user and assists the user in locating the center of the actuation surface of each key.

Where the key body 1809 is manufactured from translucent plastic or conductive, translucent plastic, the portion 1881 of the key body 1809 can serve as an alternate form of light guide 1870 that is co-molded with the key body 1809 as well. As described above, when an electroluminescent or light emitting diode light source (not shown) is configured to either project light upward from the bottom of each key, or configured to deliver light from a planar light guide 1840, light can pass through the portion 1881 forming the light guide 1870. Note that the embodiment of FIG. 18 employs a layer of translucent, non-conductive adhesive 1830 as described above. Alternately, the adhesive layer can be conductive. Note that if the adhesive is not translucent, local openings can be created to allow the light pass through.

Thus, a keypad with integrated touch sensitive apparatus can include features such as backlighting of key indicia and tactile features without compromising touch-sensitivity. Using a conductive key body to offset non-conductive light guide elements and/or non-conductive surface regions of keys allows enough charge to be transferred to a user's finger such that the capacitance sensing circuit (126) can detect a change in capacitance between a conductive layer and a transverse conductive layer.

FIG. 19 illustrates a user 1990 touching a matrix 1902 of keys configured as a touch sensitive apparatus in an electronic device 1900 in accordance with embodiments of the invention. When the user 1990 wants the keys to work as traditional keys, the keys are pressed into the keypad. This results in letters and symbols being entered into the electronic device 1900.

When the user 1990 wants to use the matrix 1902 as a touch sensitive user apparatus, the user drags 1991 a conductive object across the matrix 1902. The capacitance sensing circuit (126) detects the user's touch as user input by detecting a capacitance change between overlapping portions of the conductive layers 1915,1916,1917,1918 and the transverse conductive layers 1919,1920,1921,1922,1923,1924. A controller (128) can interpret this input to, for example, move a cursor 1992 on a display 1903 in accordance with the movement of the object along the matrix 1902. Thus, the matrix 1902 functions either as traditional keypad or as a touch sensitive apparatus without the need for a dedicated touch sensitive input or an expensive touch-sensitive display.

Figure 20:
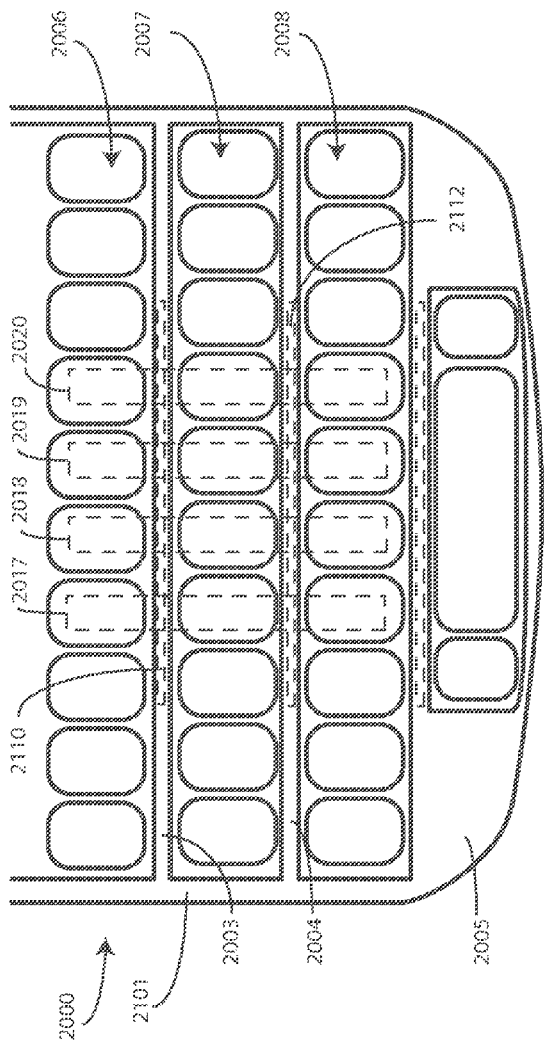
FIGS. 20 and 21 illustrate yet another embodiment of a non-linear keypad configured in accordance with embodiments of the invention.
Figure 21:
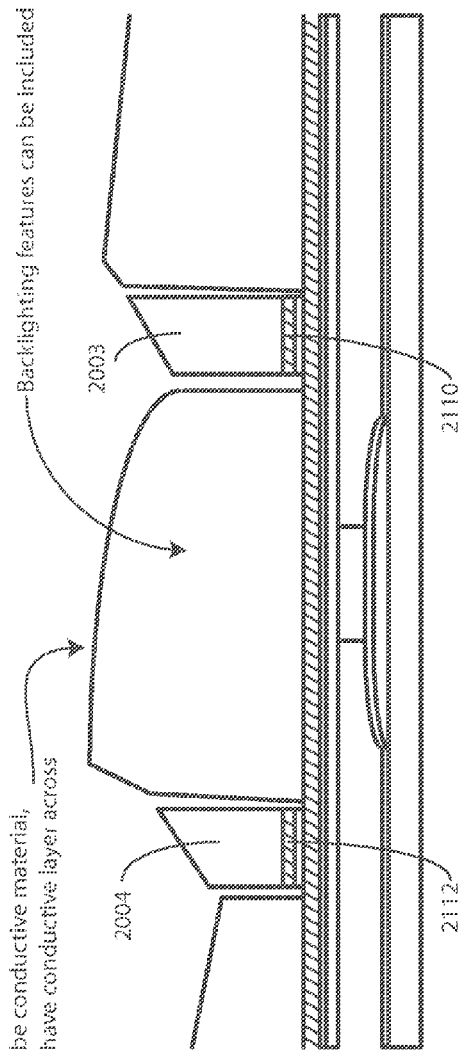

FIGS. 20 and 21 illustrate yet another alternate embodiment of a keypad 2000 configured in accordance with embodiments of the invention. This embodiment demonstrates how a touch sensitive apparatus can be integrated into a keypad stack-up having varying heights. As shown in FIG. 20, the electronic device into which the keypad 2000 is operable has a housing 2101. The housing 2101 includes portions 2003,2004,2005 disposed between sets 2006,2007,2008 of keys. Alternately, the portions 2003,2004,2005 could be configured as webbing as described in FIG. 5 above. Accordingly, the conductive strips 2017,2018,2019,2020 have been configured vertically so as to span multiple keys. Note that keys of the sets of keys 2006,2007,2008 could be electrically coupled together to form the conductive strips 2017,2018, 2019,2020 in any of the various ways described above, such as by conductive adhesive, a conductive layer spanning the tops of the keys, or by conductive layer segments having linking portions disposed between each of the conductive layer segments, or some of the same approaches described previously In the embodiment of FIGS. 20 and 21, transverse conductive strips 2110,2112 are attached to the portions 2003,2004 of the housing 2001, as shown in the sectional view of FIG. 21. The transverse conductive strips 2110,2112 have been oriented substantially horizontally so as to be transverse relative to conductive strips 2017,2018,2019,2020. The other elements of the keypad structure (e.g., keys, adhesive layer, keypad carrier, optional lightguide, etc.) are fashioned in accordance with one or more of the teachings described earlier. Note that the trans-capacitance is substantially defined in FIG. 21 as being across the portion of the housing between the transverse conductive strips 2110,2112 and the conductive strips 2017,2018,2019,2020.

Figure 22:
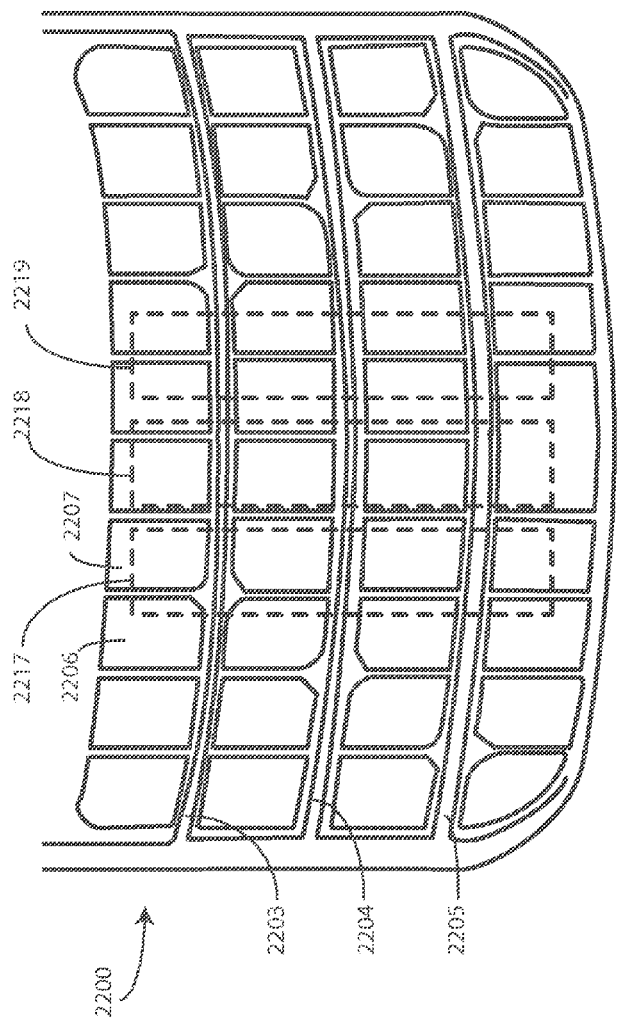
FIGS. 22 and 23 illustrate other embodiments of a non-linear keypad where one or more of drive lines or sense lines span multiple keys configured in accordance with one or more embodiments of the invention.
Figure 23:
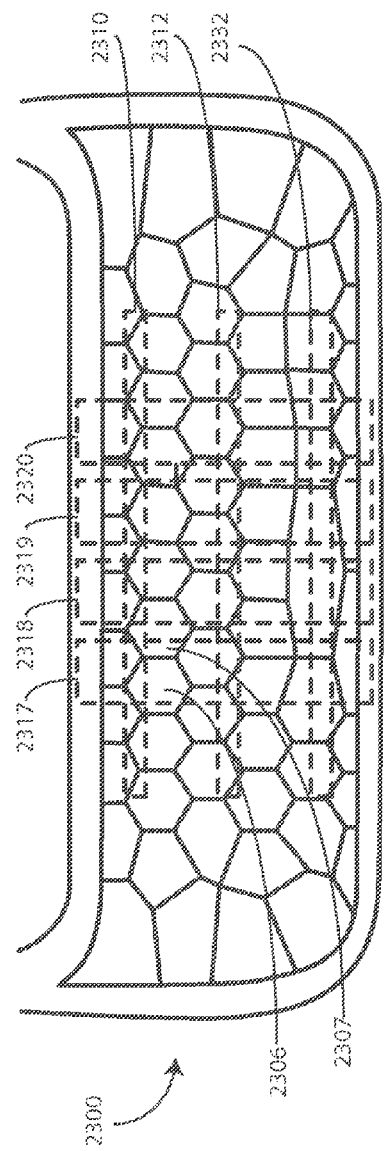

Turning now to FIGS. 22 and 23, illustrated therein are alternate embodiments of keypads 2200,2300 configured in accordance with embodiments of the invention. As shown in FIG. 22, the drive lines 2217,2218,2219 can be configured to span multiple keys. For example, drive line 2217 spans keys 2206,2207. This can be accomplished by using a continuous conductive layer that passes across the keys 2206,2207 and beneath the housing portions 2203,2204,2205. As with FIG. 20, the corresponding sense lines could be coupled to the housing portions 2203,2204,2205. Alternatively, they could be disposed beneath the keys 2206,2207 as described above. As shown in FIG. 23, both the drive lines 2317,2318,2319, 2320 and sense lines 2310,2312,2332 can be configured to span multiple keys 2306,2307 in a keypad 2300 configured in accordance with one or more embodiments described above. The ability to span keys 2306,2307 gives the designer great flexibility when designing an electronic device having a capacitive sensor configured in accordance with embodiments described above, especially those having modern keypad layouts such as that shown in FIG. 23.

While several variations of keypad stack-ups have been shown, it will be appreciated that further combinations and permutations can be created based on the examples and teachings described. For instead, key body light guides can be integrated into any of the embodiments shown, varying key heights can be implemented in any of the embodiments shown, implementations of keypads may include different stack-ups for different sections of the keypad, and additional elements may be added to the stack-ups.

It will be appreciated that embodiments of the invention described herein may be comprised of one or more conventional processors and unique stored program instructions that control the one or more processors to implement, in conjunction with certain non-processor circuits, some, most, or all of the functions of providing a touch sensitive apparatus as described herein. As such, these functions may be interpreted as steps of a method.

Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A keypad configured for touch sensitive apparatus, comprising:
 a plurality of conductive strips, each conductive strip traversing a first plurality of keys of the keypad such that each key is disposed between the plurality of conductive strips and a keypad carrier;
 a plurality of transverse conductive strips electrically isolated from the plurality of conductive strips, each transverse conductive strip traversing a second plurality of keys such that at least one key is disposed between the each conductive strip and the each transverse conductive strip;
 a plurality of intermediate conductive components electrically isolated from the plurality of conductive strips and the plurality of transverse conductive strips;
 wherein the each conductive strip and the each transverse conductive strip define a trans-capacitance that changes when a conductive object is proximately located with the conductive strip.

2. The keypad of claim 1, wherein one or more keys of the keypad comprise a light guide co-molded within a body of the one or more keys.

3. The keypad of claim 1, wherein one or more keys of the keypad comprise a body manufactured from pellucid material.

4. The keypad of claim 1, wherein the plurality of conductive strips define a plurality of apertures corresponding to, and disposed atop, the each key of the first plurality of keys.

5. An electronic device having a touch sensitive keypad device, the touch sensitive keypad device comprising:
 a matrix of keys with rows extending in a first direction and columns extending in a second direction transverse to the first direction;
 a plurality of first electrically conductive layers, each first electrically conductive layer spanning a corresponding plurality of keys disposed along the first direction;
 a plurality of second electrically conductive layers electrically isolated from the plurality of first electrically conductive layers, each second electrically conductive layer being disposed beneath another corresponding plurality of keys disposed along the second direction; and
 a plurality of intermediate conductive components electrically isolated from the plurality of first electrically conductive layers and the plurality of second electrically conductive layers;
 wherein the each first electrically conductive layer and the each second electrically conductive layer define a capacitance there between that changes when a conductive object is proximately located with any of the plurality of electrically conductive layers.

6. The electronic device of claim 5, wherein one or more of the first direction or the second direction is non-linear.

7. The electronic device of claim 5, wherein each key of the matrix of keys has a nonrectangular actuation surface.

8. The electronic device of claim 5, wherein the electronic device comprises a housing, wherein at least a portion of the housing is disposed between a first corresponding plurality of keys and a second corresponding plurality of keys.

9. The electronic device of claim 5, wherein the plurality of second electrically conductive layers are disposed along one of a key carrier, a light guide configured to deliver light from a source disposed beneath the matrix of keys through one or more keys of the matrix of keys, a rigid substrate disposed beneath the matrix of keys, a flexible substrate disposed beneath the matrix of keys, a stiffener disposed along the key carrier, or combinations thereof.

10. The electronic device of claim 5, wherein the matrix of keys comprises a QWERTY keypad, further comprising a capacitance detection circuit configured to detect changes in the capacitance.

* * * * *